(12) United States Patent
Luo et al.

(10) Patent No.: US 12,063,698 B2
(45) Date of Patent: Aug. 13, 2024

(54) COMMUNICATION METHOD AND RELATED DEVICE

(71) Applicant: HUAWEI TECHNOLOGIES CO., LTD., Guangdong (CN)

(72) Inventors: Haiyan Luo, Shenzhen (CN); Qinghai Zeng, Shanghai (CN); Mingzeng Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 422 days.

(21) Appl. No.: 17/543,100

(22) Filed: Dec. 6, 2021

(65) Prior Publication Data

US 2022/0095396 A1 Mar. 24, 2022

Related U.S. Application Data

(63) Continuation of application No. PCT/CN2020/094798, filed on Jun. 7, 2020.

(30) Foreign Application Priority Data

Jun. 6, 2019 (CN) .......................... 201910492216.7

(51) Int. Cl.
| | |
|---|---|
| H04W 76/11 | (2018.01) |
| H04L 12/46 | (2006.01) |
| H04W 76/12 | (2018.01) |

(52) U.S. Cl.
CPC ......... *H04W 76/11* (2018.02); *H04L 12/4633* (2013.01); *H04W 76/12* (2018.02)

(58) Field of Classification Search
CPC .... H04W 76/11; H04W 76/12; H04L 12/4633
See application file for complete search history.

(56) References Cited

U.S. PATENT DOCUMENTS

| | | |
|---|---|---|
| 2018/0270743 A1 | 9/2018 | Callard et al. |
| 2018/0317273 A1 | 11/2018 | Kim |

FOREIGN PATENT DOCUMENTS

| | | |
|---|---|---|
| CN | 106162730 A | 11/2016 |
| CN | 106572516 A | 4/2017 |

(Continued)

OTHER PUBLICATIONS

InterDigital Communications, "Cleanup of reference/definitions for 38.413," 3GPP TSG-RAN WG3 #98bis, R3-180063, Sophia Antipolis, France, Jan. 22-26, 2018, 80 pages.
PCT International Search Report and Written Opinion issued in International Application No. PCT/CN2020/094798 on Aug. 28, 2020, 21 pages (with English translation).

(Continued)

*Primary Examiner* — Saad A. Waqas
(74) *Attorney, Agent, or Firm* — Fish & Richardson P.C.

(57) ABSTRACT

The present disclosure discloses example communication apparatuses. One example communication apparatus includes sending request information from a first network device to a second network device, where the request information includes an identifier of a network slice, configuration information of a data radio bearer corresponding to the identifier of the network slice, and first general packet radio service tunneling protocol-user plane (GTP-U) tunnel address information corresponding to the identifier of the network slice. Feedback information is received by the first network device and from the second network device, where the feedback information includes second GTP-U tunnel address information corresponding to the identifier of the network slice. The first GTP-U tunnel address information and the second GTP-U tunnel address information identify a user plane tunnel that corresponds to the identifier of the network slice and that is between the first network device and the second network device.

8 Claims, 9 Drawing Sheets

(56) References Cited

FOREIGN PATENT DOCUMENTS

| | | | |
|---|---|---|---|
| CN | 108366398 | A | 8/2018 |
| CN | 108990116 | A | 12/2018 |
| CN | 109041119 | A | 12/2018 |
| CN | 109151871 | A | 1/2019 |
| CN | 109275151 | A | 1/2019 |
| CN | 109474967 | A | 3/2019 |
| CN | 109565465 | A | 4/2019 |
| CN | 109842910 | A | 6/2019 |
| CN | 109845360 | A | 6/2019 |
| CN | 110475381 | A | 11/2019 |
| EP | 3606276 | A1 | 2/2020 |
| WO | 2018231139 | A1 | 12/2018 |
| WO | 2019015472 | A1 | 1/2019 |
| WO | 2019091396 | A1 | 5/2019 |

OTHER PUBLICATIONS

Office Action issued in Chinese Application No. 201910492216.7 on Jun. 13, 2022, 7 pages (with English translation).

Yanxia et al., "5G Core Network Key Technologies and Service Support," Telecommunications Technology, Jul. 2017, 5 pages (with English abstract).

Ericsson, "Signalling aspects of network slicing," 3GPP TSG-RAN WG2 #101, R2-1802635, Athens, Greece, Feb. 26-Mar. 2, 2018, 4 pages.

Huawei, "RAN Support for Core Network Slicing," RAN WG3 Meeting #93, Gothenburg, Sweden, Aug. 22-26, 2016, R3-161759, 13 pages.

Office Action issued in Chinese Application No. 201910492216.7 on Jan. 25, 2022, 25 pages.

Extended European Search Report issued in European Application No. 20818371.5 on May 12, 2022, 9 pages.

Huawei, "QoS and Slice for Option 7," 3GPP TSG RAN WG3 Meeting #97bis, R3-173917, Prague, Czech Republic, Oct. 9-13, 2017, 19 pages.

COMMUNICATION METHOD AND RELATED DEVICE

CROSS-REFERENCE TO RELATED APPLICATIONS

This application is a continuation of International Application No. PCT/CN2020/094798, filed on Jun. 7, 2020, which claims priority to Chinese Patent Application No. 201910492216.7, filed on Jun. 6, 2019. The disclosures of the aforementioned applications are incorporated herein by reference in their entirety.

TECHNICAL FIELD

This application relates to the field of communication technologies, and more specifically, to a communication method and a related device.

BACKGROUND

In a conventional mechanism, before a terminal device performs data transmission with a radio access network device, the terminal device needs to establish a radio resource control (RRC) connection to the radio access network device. Then, the radio access network device sends data. radio bearer (DRB) configuration information to the terminal device by using an RRC reconfiguration message, and the terminal device and the radio access network device separately establish, based on the DRB configuration information, a DRB used for communication between the terminal device and the radio access network device. In this way, the terminal device can perform data transmission with the radio access network device by using the established DRBs, and further, the terminal device can perform data transmission with a core network device by using the radio access network device. In the conventional mechanism, depending on whether the terminal device establishes an RRC connection to the radio access network device, states of the terminal device include an RRC connected state, an RRC idle state, and a third state. The RRC connected state means that the terminal device has established an RRC connection to an access network. The RRC idle state means that the terminal device has not established an RRC connection to the radio access network device. The third state is between the RRC connected state and the RRC idle state, and in this case, the terminal device has not established an RRC connection to the radio access network device, but the radio access network device and the core network device still reserve channels for the terminal device. The third state may also be referred to as an inactive state in a new radio (NR) communication system. When UE is in an RRC connected state, an RRC connection exists between the UE and a base station, and a dedicated control plane connection and a dedicated user plane tunnel exist between the base station and a core network. When the UE is in an RRC inactive state, an RRC connection does not exist between the UE and the base station, but a dedicated control plane connection and a dedicated user plane tunnel exist between a base station and the core network. When the UE is in an idle state, an RRC connection does not exist between the UE and the base station, and neither a dedicated control plane connection nor a dedicated user plane tunnel exists between the base station and the core network.

To reduce time of waiting a terminal device to establish an RRC connection to a radio access network device before the terminal device communicates with the radio access network device, a third generation partnership project (3GPP) technical specification defines an early data transmission (EDT) technology in an LTE communication system. Specifically, the EDT technology supports a user plane (UP) data transmission solution and a control plane (CP) data transmission solution. In the UP solution, a terminal device in an RRC inactive state is allowed to include encrypted communication data in an RRC connection resume request or a random access preamble sent to a radio access network device. After obtaining a context (LE context) of the terminal device and decrypting the communication data, the radio access network device sends the communication data to a core network based on the context of the terminal device by using a dedicated user plane tunnel between the radio access network device and a core network device. In the CP solution, a terminal device in an RRC idle state or an RRC inactive state is allowed to include communication data in a non-access stratum (NAS) message, so that the terminal device can send, to a core network by using a radio access network device, the NAS message that carries the communication data. According to the EDT technology, the terminal device in the RRC idle state or the RRC inactive state in the communication system can send the communication data to the radio access network device when the terminal device has not established an RRC connection to the radio access network device.

SUMMARY

In the UP solution in the technology, when a radio access network device stores a context of a terminal device, after receiving communication data sent by the terminal device, the radio access network device may directly send the communication data of the terminal device to a core network. If the radio access network device does not store the context of the terminal device, after receiving the communication data of the terminal device and before sending the communication data to the core network, the radio access network device further needs to obtain the context of the terminal device by using, for example, a source radio access network device, and sends a path switch message to a core network device, so that the radio access network device and the core network device establish a user plane tunnel. The radio access network device can send, only after the radio access network device and the core network device establish the user plane tunnel, communication data to the core network device by using the established user plane tunnel. In this case, in a process in which the terminal device in an RRC idle state or an RRC inactive state communicates with the radio access network device based on the EDT technology, when the terminal device sends communication data to the core network device, there is still an end-to-end delay that is caused when the terminal device waits for the radio access network device to obtain the context of the terminal device and/or to establish the user plane tunnel, corresponding to the terminal device, between the radio access network device and the core network device. In the CP solution in the EDT technology, data does not need to be transmitted by using a dedicated user plane tunnel between a base station and a core network, that is, after receiving a NAS message carrying user plane data, the base station directly sends the NAS message to the core network by using a control plane. The delay caused on a UP plane by a path switch and the establishment of the dedicated user plane tunnel does not exist. However, in the CP solution, user plane data of different slices cannot be differentiated or processed with different priorities.

Therefore, this application provides a technology on a network slice specific or a service specific data radio bearer (DRB). A radio access network device sends, for different network slices or services, DRB configuration information corresponding to the network slices or the services, so that all terminal devices working on a same network slice can use, without performing an RRC connection establishment procedure or an RRC reconfiguration procedure, a DRB corresponding to the network slice to perform data transmission with the radio access network device. Therefore, the DRB corresponding to the network slice may be referred to as a preconfigured DRB. In addition, it is assumed that a user plane tunnel corresponding to the network slice has been established between the radio access network device and a core network. In other words, the radio access network device may send user plane data to the core network based on the user plane tunnel corresponding to the DRB. In this way, an end-to-end delay between a terminal device not in an RRC connected state and the core network is greatly reduced when the terminal device performs data transmission. Therefore, the DRB may also be referred to as a preconfigured DRB. For brevity, a DRB corresponding to a network slice or a service is collectively referred to as a DRB corresponding to a network slice below. Alternatively, UE in a connected state may directly perform data transmission with an access network device based on a DRB corresponding to a network slice provided by the access network device.

According to a first aspect, this application provides a communication method. The method may include: A radio access network device sends a first message to a terminal device, where the first message includes an identifier of a network slice and configuration information of a data radio bearer corresponding to the network slice; and the radio access network device receives data from the terminal device by using the data radio bearer, where the data corresponds to the network slice. According to this method, examples of beneficial effects include: The radio access network device and the terminal device can communicate by using a data radio bearer corresponding to a network slice, to reduce time for waiting the terminal device and the radio access network device to establish a radio resource control connection when the terminal device communicates with the radio access network device. Therefore, efficiency of communication between the terminal device and the radio access network device is improved.

In a feasible design, the configuration information of the data radio bearer includes a logical channel identifier and/or an identifier of the data radio bearer. According to this method, examples of beneficial effects include: The terminal device may send the data by using a logical channel corresponding to the logical channel identifier or the data radio bearer; subsequently, the radio access network device may identify, by using the logical channel identifier and/or the identifier of the data radio bearer carried in the data, the data radio bearer or the network slice corresponding to the data. This implements data communication between the terminal device and the radio access network device, and reduces a delay in communication between the terminal device and the radio access network device.

In a feasible design, the radio access network device obtains the data radio bearer based on the logical channel identifier carried in the received data and/or the identifier of the data radio bearer carried in the data. According to this method, examples of beneficial effects include: The radio access network device may further transmit the received data by using the data radio bearer. This implements data communication between the terminal device and the radio access network device, and reduces a delay in communication between the terminal device and the radio access network device.

In a feasible design, the method includes: The radio access network device obtains the identifier of the network slice based on the data radio bearer, and the radio access network device transmits the data on a user plane tunnel that corresponds to the identifier of the network slice and that is between the radio access network device and a core network device; or the radio access network device obtains the identifier of the network slice carried in the received data, and the radio access network device transmits the data on a user plane tunnel that corresponds to the identifier of the network slice and that is between the radio access network device and a core network device. According to this method, examples of beneficial effects include: The radio access network device may transmit the received data by using the user plane tunnel that corresponds to the identifier of the network slice and that is between the radio access network device and the core network device. This implements data communication between the radio access network device and the core network device, and reduces an end-to-end delay in communication between the terminal device and the core network device.

In a feasible design, before the first message is sent, the method includes: sending a second message, where the second message includes first indication information, and the first indication information is used to indicate whether the first message is sent. According to this method, examples of beneficial effects include: The terminal device may obtain information indicating whether the first message is sent. In this way, the first message does not need to be sent all the time, reducing air interface signaling overheads.

In a feasible design, the method includes: when the first indication information indicates that the first message is not sent, receiving request information from the terminal device, where the request information is used to request to send the first message. According to this method, examples of beneficial effects include: The terminal device may independently determine, according to a requirement, whether the first message needs to be requested, to flexibly obtaining the first message.

In a feasible design, the method includes: sending a third message, where the third message includes an identifier of a sharing area, and the sharing area corresponds to all network slices, or the sharing area corresponds to the identifier of the network slice. According to this method, examples of beneficial effects include: The terminal device may identify a sharing area in which the terminal device is currently located.

In a feasible design, the method includes: sending a fourth message, where the fourth message includes second indication information, and the second indication information is used to indicate whether the data radio bearer is a data radio bearer in the sharing area. According to this method, examples of beneficial effects include: The terminal device may identify whether a data radio bearer that is on a radio access network device side and that is used to receive data currently to be sent is applicable in a sharing area or only in a cell.

In a feasible design, the configuration information of the data radio bearer includes configuration information of a data radio bearer on an uplink carrier, and/or configuration information of a data radio bearer on a supplementary uplink carrier. According to this method, examples of beneficial effects include: The terminal device may obtain configuration information of data radio bearers on different uplink carriers.

In a feasible design, the configuration information of the data radio bearer further includes a network slice sharing identifier, and the network slice sharing identifier is used to identify a plurality of terminal devices in the sharing area when the radio access network device performs multicast communication with the plurality of terminal devices by using the data radio bearer. According to this method, examples of beneficial effects include: The terminal device may perform multicast communication with a plurality of terminal devices by using the data radio bearer, thereby improving communication efficiency.

In a feasible design, the configuration information of the data radio bearer further includes a set of cells or radio access network devices in the sharing area. According to this method, examples of beneficial effects include: The terminal device may identify a cell or a radio access network device belonging to a current sharing area.

According to a second aspect, this application provides a communication method. The method may include: A terminal device receives a first message from a radio access network device, where the first message includes an identifier of a network slice and configuration information of a data radio bearer corresponding to the identifier of the network slice; and the terminal device sends data to the radio access network device by using the data radio bearer, where the data corresponds to the network slice.

In a feasible design, the configuration information of the data radio bearer includes a logical channel identifier and/or an identifier of the data radio bearer.

In a feasible design, the method includes: The terminal device determines the data radio bearer based on the network slice corresponding to the data, and sending the data to the radio access network device by using the data radio bearer, where the data carries the logical channel identifier.

In a feasible design, before the first message is received, the method includes: receiving a second message from the radio access network device, where the second message includes first indication information, and the first indication information is used to indicate whether the first message is sent.

In a feasible design, when the first indication information indicates that the first message is not sent, the method includes: sending request information to the radio access network device, where the request information is used to request the radio access network device to send the first message.

In a feasible design, when the first indication information indicates that the first message is not sent, the method includes: receiving a third message, where the third message includes an identifier of a sharing area, and the sharing area corresponds to all network slices, or the sharing area corresponds to the identifier of the network slice.

In a feasible design, the method includes: receiving a fourth message, where the fourth message includes second indication information, and the second indication information is used to indicate whether the data radio bearer is a data radio bearer in the sharing area.

In a feasible design, When the second indication information indicates that the data radio bearer is not a data radio bearer in the sharing area, the method includes: sending request information to the radio access network device, where the request information is used to request the radio access network device to send the first message. According to this method, examples of beneficial effects include: When identifying that a data radio bearer that is on a radio access network device side and that is used to receive data currently to be sent is applicable only in a cell, the terminal device may request the first message, thereby flexibly obtaining the first message.

In a feasible design, when the second indication information indicates that the data radio bearer is a data radio bearer in the sharing area, the method further includes: when the sharing area corresponds to the identifier of the network slice, and the identifier of the sharing area is different from an identifier that is stored in the terminal device and that is of the sharing area corresponding to the identifier of the network slice, sending request information to the radio access network device, where the request information is used to request the radio access network device to send the first message. According to this method, examples of beneficial effects include: When identifying that a data radio bearer that is on a radio access network device side and that is used to receive data currently to be sent is applicable in a sharing area, where the sharing area is different from a previously stored sharing area corresponding to the data radio bearer, the terminal device may request the first message, thereby flexibly obtaining the first message.

In a feasible design, the configuration information of the data radio bearer may include configuration information of a data radio bearer on an uplink carrier, and/or configuration information of a data radio bearer on a supplementary uplink carrier.

According to a third aspect, this application provides a communication method. The method may include: A first network device sends request information to a second network device, where the request information includes an identifier of a network slice, configuration information of a data radio bearer corresponding to the identifier of the network slice, and first general packet radio service tunneling protocol-user plane (GTP-U) tunnel address information corresponding to the identifier of the network slice; and the first network device receives feedback information from the second network device, where the feedback information includes second GTP-U tunnel address information corresponding to the identifier of the network slice. The first GTP-U tunnel address information and the second GTP-U tunnel address information are used to identify a user plane tunnel that corresponds to the identifier of the network slice and that is between the first network device and the second network device. The first network device has a radio link control layer function, a media access control layer function, and a physical layer function, and the second network device has a packet data convergence protocol layer function and a radio resource control layer function. According to this method, examples of beneficial effects include: A GTP-U tunnel that corresponds to the identifier of the network slice and that is between the first network device and the second network device may be established. This implements data communication between the first network device and the second network device, and reduces a delay in communication between the first network device and the second network device.

According to a fourth aspect, this application provides a communication method. The method may include: A second network device receives request information from a first network device, where the request information includes an identifier of a network slice, configuration information of a data radio bearer corresponding to the identifier of the network slice, and first general packet radio service tunneling protocol-user plane (GTP-U) tunnel address information corresponding to the identifier of the network slice; and the second network device sends feedback information to the first network device, where the feedback information includes second GTP-U tunnel address information corresponding to the identifier of the network slice. The first GTP-U tunnel address information and the second GTP-U tunnel address information are used to identify a user plane tunnel that corresponds to the identifier of the network slice and that is between the first network device and the second network device. The first network device has a radio link control layer function, a media access control layer function, and a physical layer function, and the second network device has a packet data convergence protocol layer function and a radio resource control layer function.

According to a fifth aspect, this application provides a communication method. The method may include: A core network management entity receives a request message from a radio access network device, where the request message includes an identifier of a network slice and first general packet radio service tunneling protocol-user plane (GTP-U) tunnel address information corresponding to the identifier of the network slice; and the core network management entity sends second GTP-U tunnel address information corresponding to the identifier of the network slice to the radio access network device, where the first GTP-U tunnel address information and the second GTP-U tunnel address information are used to identify a user plane tunnel that corresponds to the identifier of the network slice and that is between the radio access network device and a core network user-plane network element. According to this method, examples of beneficial effects include: A GTP-U tunnel that corresponds to the identifier of the network slice and that is between the radio access network device and the core network device may be established. This implements data communication between the radio access network device and the core network device, and reduces a delay in communication between the radio access network device and the core network device.

According to a sixth aspect, this application provides a communication method. The method may include: A radio access network device sends a request message to a core network management entity, where the request message includes an identifier of a network slice and first general packet radio service tunneling protocol-user plane (GTP-U) tunnel address information corresponding to the identifier of the network slice; and the radio access network device receives second GTP-U tunnel address information corresponding to the identifier of the network slice from the core network management entity, where the first GTP-U tunnel address information and the second GIP-U tunnel address information are used to identify a user plane tunnel that corresponds to the identifier of the network slice and that is between the radio access network device and a core network user-plane network element. According to this method, examples of beneficial effects include:

In a feasible design of the third aspect to the sixth aspect, the GTP-U tunnel address information includes an Internet Protocol IP address and/or a tunnel endpoint identifier (TEID). According to this method, examples of beneficial effects include:

In a feasible design of the third aspect to the sixth aspect, the request message further includes indication information, and the indication information is used to indicate to request to establish a user plane unicast tunnel corresponding to the identifier of the network slice or a user plane multicast tunnel corresponding to the identifier of the network slice. According to this method, examples of beneficial effects include:

According to a seventh aspect, this application provides a radio access network device. The radio access network device may include: a sending module, configured to send a first message to a terminal device, where the first message includes an identifier of a network slice and configuration information of a data radio bearer corresponding to the network slice; and an obtaining module, configured to receive data from the terminal device by using the data radio bearer, where the data corresponds to the network slice.

According to an eighth aspect, this application provides a terminal device. The terminal device may include: an obtaining module, configured to receive a first message from a radio access network device, where the first message includes an identifier of a network slice and configuration information of a data radio bearer corresponding to the identifier of the network slice; and a sending module, configured to send data to the radio access network device by using the data radio bearer, where the data corresponds to the network slice.

According to a ninth aspect, this application provides a first network device. The first network device may include: a sending module, configured to send request information to a second network device, where the request information includes an identifier of a network slice, configuration information of a data radio bearer corresponding to the identifier of the network slice, and first general packet radio service tunneling protocol-user plane (GTP-U) tunnel address information corresponding to the identifier of the network slice; and an obtaining module, configured to receive feedback information from the second network device, where the feedback information includes second GTP-U tunnel address information corresponding to the identifier of the network slice. The first GTP-U tunnel address information and the second GTP-U tunnel address information are used to identify a user plane tunnel that corresponds to the identifier of the network slice and that is between the first network device and the second network device. The first network device has a radio link control layer function, a media access control layer function, and a physical layer function, and the second network device has a packet data convergence protocol layer function and a radio resource control layer function.

According to a tenth aspect, this application provides a second network device. The second network device may include: an obtaining module, configured to receive request information from a first network device, where the request information includes an identifier of a network slice, configuration information of a data radio bearer corresponding to the identifier of the network slice, and first general packet radio service tunneling protocol-user plane (GTP-U) tunnel address information corresponding to the identifier of the network slice; and a sending module, configured to send feedback information to the first network device, where the feedback information includes second GTP-U tunnel address information corresponding to the identifier of the network slice. The first GTP-U tunnel address information and the second GTP-U tunnel address information are used to identify a user plane tunnel that corresponds to the identifier of the network slice and that is between the first network device and the second network device. The first network device has a radio link control layer function, a media access control layer function, and a physical layer function, and the second network device has a packet data convergence protocol layer function and a radio resource control layer function.

According to an eleventh aspect, this application provides a core network management entity. The core network management entity may include: an obtaining module, configured to receive a request message from a radio access network device, where the request message includes an identifier of a network slice and first general packet radio service tunneling protocol-user plane (GTP-U) tunnel address information corresponding to the identifier of the network slice; and a sending module, configured to send second GTP-U tunnel address information corresponding to the identifier of the network slice to the radio access network device, where the first GTP-U tunnel address information and the second GTP-U tunnel address information are used to identify a user plane tunnel that corresponds to the identifier of the network slice and that is between the radio access network device and a core network user-plane network element.

According to a twelfth aspect, this application provides a radio access network device. The radio access network device may include: a sending module, configured to send a request message to a core network management entity, where the request message includes an identifier of a network slice and first general packet radio service tunneling protocol-user plane (GTP-U) tunnel address information corresponding to the identifier of the network slice; and an obtaining module, configured to receive second GTP-U tunnel address information corresponding to the identifier of the network slice from the core network management entity, where the first GTP-U tunnel address information and the second GTP-U tunnel address information are used to identify a user plane tunnel that corresponds to the identifier of the network slice and that is between the radio access network device and a core network user-plane network element.

In a feasible design of the ninth aspect to the twelfth aspect, the tunnel address information includes an Internet Protocol IP address and/or a tunnel endpoint identifier (TEID).

In a feasible design of the ninth aspect to the twelfth aspect, the request message further includes indication information, and the indication information is used to indicate to request to establish a user plane unicast tunnel corresponding to the identifier of the network slice or a user plane multicast tunnel corresponding to the identifier of the network slice.

According to a thirteenth aspect, this application provides a communication apparatus. The communication apparatus may include at least one processor and a power supply circuit, where the power supply circuit is configured to supply power to the processor, and related program instructions are executed by the at least one processor, so that, the communication apparatus implements a function of the terminal device or the radio access network device in the method according to any one of the first aspect, the second aspect, or any design of the first aspect or the second aspect, implements a function of the first network device or the second network device in the method according to any one of the third aspect, the fourth aspect, or any design of the third aspect or the fourth aspect, or implements a function of the radio access network device or the core network device in the method according to any one of the fifth aspect, the sixth aspect, or any design of the fifth aspect or the sixth aspect. Optionally, the communication apparatus may further include at least one memory, and the memory stores the related program instructions. The communication apparatus may be the terminal device or the radio access network device in the method according to any one of the first aspect, the second aspect, or any design of the first aspect or the second aspect, may be the first network device or the second network device in the method according to any one of the third aspect, the fourth aspect, or any design of the third aspect or the fourth aspect, or may be the radio access network device or the core network device in the method according to any one of the fifth aspect, the sixth aspect, or any design of the fifth aspect or the sixth aspect.

According to a fourteenth aspect, this application provides a system chip, where the system chip may be used in a communication apparatus. The system chip includes at least one processor and a power supply circuit, where the power supply circuit is configured to supply power to the processor, and related program instructions are executed by the at least one processor, so that the communication apparatus implements a function of the terminal device or the radio access network device in the method according to any one of the first aspect, the second aspect, or any design of the first aspect or the second aspect, implements a function of the first network device or the second network device in the method according to any one of the third aspect, the fourth aspect, or any design of the third aspect or the fourth aspect, or implements a function of the radio access network device or the core network device in the method according to any one of the fifth aspect, the sixth aspect, or any design of the fifth aspect or the sixth aspect, Optionally, the system chip may further include at least one memory. The memory stores the related program instructions.

According to a fifteenth aspect, this application provides a computer-readable storage medium, where the computer-readable storage medium may be used in a communication apparatus. The computer-readable storage medium stores program instructions. When the related program instructions are run, the communication apparatus is enabled to implement a function of the terminal device or the radio access network device in the method according to any one of the first aspect, the second aspect, or any design of the first aspect or the second aspect, implement a function of the first network device or the second network device in the method according to any one of the third aspect, the fourth aspect, or any design of the third aspect or the fourth aspect, or implement a function of the radio access network device or the core network device in the method according to any one of the fifth aspect, the sixth aspect, or any design of the fifth aspect or the sixth aspect.

According to a sixteenth aspect, this application provides a computer program product, where the computer program product includes program instructions. When the related program instructions are executed, the communication apparatus is enabled to implement a function of the terminal device or the radio access network device in the method according to any one of the first aspect, the second aspect, or any design of the first aspect or the second aspect, implement a function of the first network device or the second network device in the method according to any one of the third aspect, the fourth aspect, or any design of the third aspect or the fourth aspect, or implement a function of the radio access network device or the core network device in the method according to any one of the fifth aspect, the sixth aspect, or any design of the fifth aspect or the sixth aspect.

According to a seventeenth aspect, this application provides a communication system, where the system may include one or more of the following: the radio access network device according to the seventh aspect, the terminal device according to the eighth aspect, the first network device according to the ninth aspect, the second network device according to the tenth aspect, the core network management entity according to the eleventh aspect, the radio access network device according to the twelfth aspect, the communication apparatus according to the thirteenth aspect, the system chip according to the fourteenth aspect, the computer-readable storage medium according to the fifteenth aspect, and the computer program product according to the sixteenth aspect.

BRIEF DESCRIPTION OF DRAWINGS

The accompanying drawings, which may be included in this specification and constitute a part of this specification, together with this specification show example embodiments, or features and aspects of this application, and are used to explain principles of this application. It is clear that the accompanying drawings in the following descriptions merely show some embodiments of this application, and a person of ordinary skill in the art can derive other drawings from these accompanying drawings without creative efforts.

DESCRIPTION OF EMBODIMENTS

Figure 1:
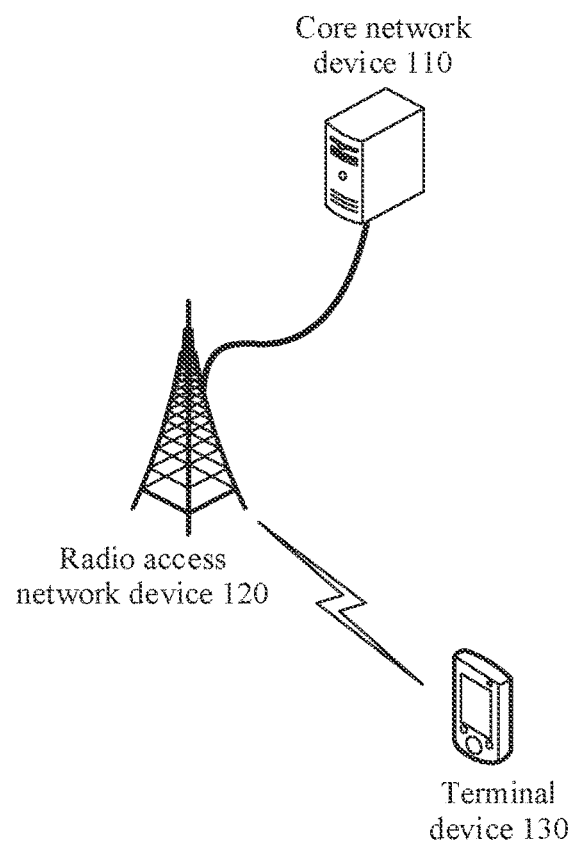
FIG. 1 is a schematic diagram of a possible communication system according to this application.

In the descriptions of this application, terms such as "first" and "second" are merely used for distinction and description, and should not be understood as an indication or implication of relative importance, or as an indication or implication of an order. For information with different numbers, such as "first information" in this application, the numbers are merely used for contextual convenience, and different sequence numbers do not have specific technical meanings. For example, first information or second information may be understood as one or any one of a series of pieces of information. A function of the numbered information, for example, may be determined based on context content of the numbered information and/or a function of information carried in the numbered information. It may be understood that, during specific implementation, information with different numbers may be same information or a same type of information, and the information with different numbers may be carried in a same message or a same type of message, or the information with different numbers may be a same message or a same type of message. This is not limited in this application.

The term such as "operation 201" or "operation 202" in this application is merely used for distinction and description, and cannot be understood as an indication or implication of relative importance of an operation, or as an indication or implication of an execution sequence of an operation.

The term "and/or" in this application describes only an association relationship for describing associated objects and represents that three relationships may exist. For example, A and/or B may represent the following three cases: Only A exists, both A and B exist, and only B exists, In addition, the character "/" in this specification generally indicates an "or" relationship between the associated objects.

In this application, "at least one" means one or more, and "a plurality of" means two or more. The term "and/or" describes an association relationship for describing associated objects and represents that three relationships may exist. For example, A and/or B may represent the following three cases: Only A exists, both A and B exist, and only B exists, where A and B may be singular or plural. The character "/" generally indicates an "or" relationship between the associated Objects. "At least one of the following items (pieces)" or a similar expression thereof means any combination of the items, including any combination of one item piece or a plurality of items (pieces). For example, at least one of a, b, or c may represent: a, b, c, a and b, a and c, b and c, or a, b, and c, where a, b, and c may be singular or plural.

In this application, the terms "may include" "have", and any other variants are intended to cover the non-exclusive inclusion, for example, a process, method, system, product, or device that includes a list of steps or units is not necessarily limited to those steps or units that are clearly listed, but may include other steps or units not clearly listed or inherent to the process, method, product, or device.

In this application, "transmission" may include the following three cases: data sending, data receiving, or data sending and data receiving. That is, data transmission herein includes uplink data transmission and/or downlink data transmission. Data may include a channel and/or a signal. Uplink data transmission is uplink channel transmission and/or uplink signal transmission, and downlink data transmission is downlink channel transmission and/or downlink signal transmission.

The technical solutions in the embodiments of this application may be applied to various communication systems, for example, a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an time division duplex (TDD) system, a universal mobile telecommunication system (UMTS), a worldwide interoperability for microwave access (WiMAX) communication system, a new radio (NR) system in a 5th generation (5G) mobile communication system, and another network system that may be used to provide a mobile communication service. This is not limited in this application.

In this application, a terminal device may generally be a device that has a capability of communicating with a network side device, and may be, for example, user equipment (UE), an access terminal device, a subscriber unit, a subscriber station, a mobile station, a remote station, a remote terminal device, a mobile device, a user terminal device, a wireless terminal device, a user agent, or a user apparatus. For example, the terminal device may alternatively be a cellular phone, a cordless phone, a session initiation protocol (SIP) phone, a wireless local loop (WLL) station, a personal digital assistant (PDA), a handheld device or a computing device having a wireless communication function, another processing device connected to a wireless modem, a vehicle-mounted device, a wearable device, a terminal device in a future 5G network, a terminal device in a future evolved public land mobile network (PLMN), or a vehicle device in vehicle-to-everything (V2X). A specific implementation form of the terminal device is not limited in the embodiments of this application.

In this application, a network device or a radio access network device may generally be a device that can be configured to communicate with a terminal device, and may be, for example, a base transceiver station (BTS) in a GSM system or a CDMA system, a NodeB (NB) in a WCDMA system, an evolved NodeB (eNB) in an LTE system, a radio controller, a relay station, an access point, a vehicle-mounted device, a road side unit (RSU), or a wearable device in a cloud radio access network (CRAN) scenario, a radio access network device in a future 5G network, such as an NR nodeB (gNB or gNodeB), a control unit (CU), or a distributed unit (DU), or a radio access network device in a future evolved PLMN network. A specific implementation form of the radio access network device is not limited in the embodiments of this application.

The following describes the technical solutions in this application with reference to the accompanying drawings. For example, features or content marked by dashed lines in the accompanying drawings in the embodiments of this application may be understood as optional operations or optional structures of the embodiments.

FIG. 1 is a schematic block diagram of a wireless communication system 100 to which an embodiment of this application is applicable. As shown in FIG. 1, the communication system includes a core network device 110, a radio access network (RAN) device 120, and at least one terminal device (for example, terminal devices 130 and 140 in FIG. 1). The terminal device is connected to the radio access network device in a wireless communication manner, and the radio access network device is connected to the core network device in a wireless communication manner or in a wired communication manner. The core network device and the radio access network device may be independent different physical devices, functions of the core network device and functions of the radio access network device may be integrated into a same physical device, or some functions of the core network device and some functions of the radio access network device may be integrated into one physical device. The terminal device may be at a fixed location or may be mobile. It should be understood that FIG. 1 is merely a schematic diagram, and the communication system may further include another network device, for example, may further include a wireless relay device and a wireless backhaul device, which are not shown in FIG. 1. Quantities of core network devices, radio access network devices, and terminal devices included in the mobile communication system are not limited in the embodiments of this application. An uplink transmission scenario is used as an example in this application. Certainly, this application is further applicable to a downlink transmission scenario. In this application, "network slice" may be replaced with "UE group". For example, different UE groups correspond to different DRB configurations. The UE group may be identified by using a group identifier, for example, an application layer group identifier, a RAN group identifier, or another group identifier. This is not limited thereto.

The core network device 110 or the radio access network device 120 allocates, to the terminal device 130, a configuration of a DRB corresponding to a network slice, where the network slice includes a network slice of an access network or a network slice of a core network.

On a terminal device side, the DRB corresponding to the network slice may mean that a DRB is "common" to data that is of the terminal device 130 and that belongs to a same slice. For example, data 1 and data 2 of the terminal device 130 belong to a network slice 1. In this case, the data 1 of the terminal device 130 may communicate with the radio access network device by using a DRB corresponding to the data 2. In other words, a DRB corresponding to the network slice 1 is shared by the data 1 and the data 2 that belong to the network slice 1.

Optionally, on a radio access network device side, the DRB corresponding to the network slice may mean that a radio link control (RLC) layer and/or a packet data convergence protocol (PDCP) layer on the radio access network device side are/is shared by different terminal devices that send data belonging to a same network slice. That is, the DRB corresponding to the network slice may mean that the RLC layer and the PDCP layer are shared, that the RLC layer is not shared but the PDCP layer is shared, or that the RLC layer is shared but the PDCP layer is not shared. Such the DRB corresponding to the network slice may be referred to as a "sharing DRB".

Optionally, on a radio access network device side, the DRB corresponding to the network slice may alternatively mean that even for different terminal devices that send data belonging to a same network slice, the radio access network device still establishes a corresponding PDCP entity and a corresponding RLC entity for each terminal device. That is, terminal devices that send data belonging to a same network slice do not share a PDCP entity and an RLC entity on the radio access network device side. In other words, DRBs of different terminal devices are independent on the radio access network device side, and configuration information of the DRBs of the different terminal devices is shared on the radio access network device side. Such the DRB corresponding to the network slice may be referred to as a "DRB whose DRB preconfiguration information is shared".

In addition, a user plane tunnel between the core network device 110 and the radio access network device 120 is further established for each network slice. For network slices 1, 2, and 3, a tunnel 0, a tunnel 1, and a tunnel 2 are established between the radio access network device 120 and the core network device 110. In this way, when the terminal device 130 performs data transmission by using a corresponding to a network slice, after receiving user plane data sent by the terminal device 130, the radio access network device 120 may identify the corresponding network slice based on the DRB corresponding to the network slice, to find a user plane tunnel corresponding to the network slice, and send the user plane data of the terminal device 130 to the core network. For example, during data transmission, after the terminal device 130 sends uplink communication data to the radio access network device 120 by using a DRB 1 corresponding to the network slice 1, the radio access network device may identify the corresponding network slice 1 based on the DRB 1. The uplink communication data of the terminal device 130 is sent to the core network device 110 by using the user plane tunnel 1 that is between the radio access network device 120 and the core network device 110 and that corresponds to the network slice 1. This reduces an end-to-end (end to end, E2E) delay that exists when the terminal device waits for the radio access network device 120 to obtain a context of the terminal device during the data transmission and/or to establish the user plane tunnel corresponding to the terminal device.

Figure 2A:
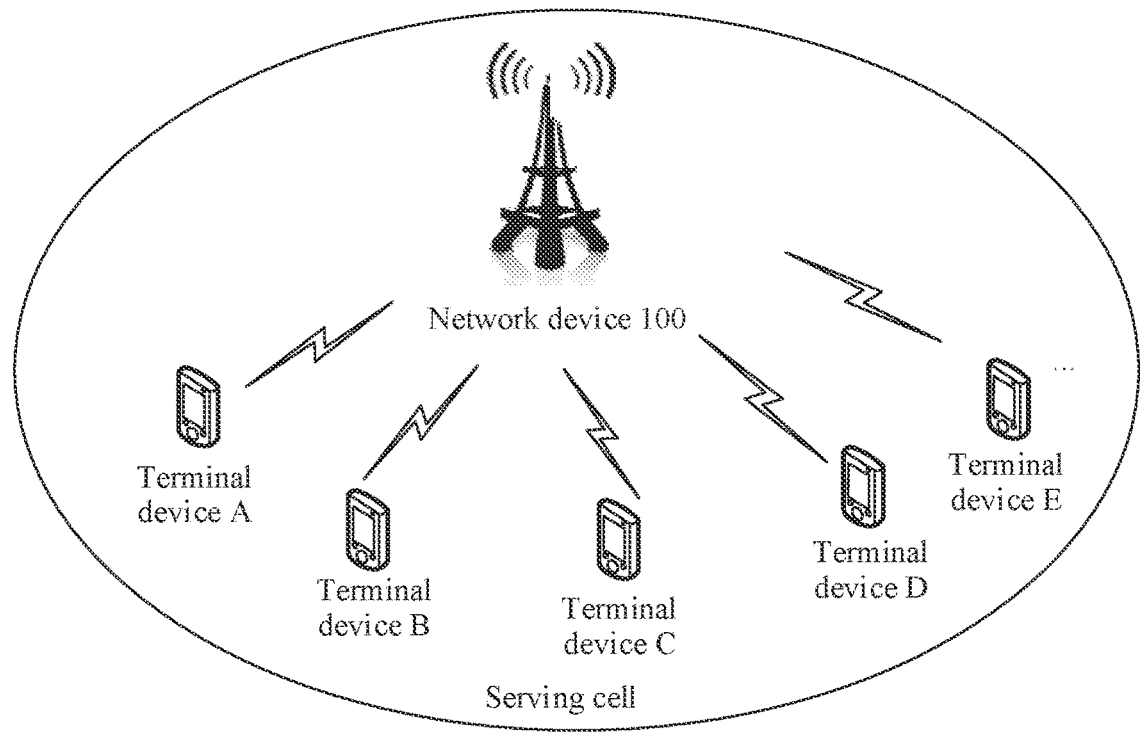
FIG. 2A is a schematic flowchart of a communication method according to an embodiment of this application.

FIG. 2A is a schematic diagram of a technology on a DRB corresponding to a network slice according to this application. As shown in FIG. 2A, terminal devices A, B, C, D, and are within network coverage of a radio access network device 100. The terminal device A is a connected-state user, and a radio access network device side establishes a corresponding DRB 0 for the terminal device A. The terminal devices B, C, D, and E are non-connected-state users, and the radio access network device 100 establishes a DRB corresponding to a network slice for the terminal devices B, C, D, and E. The DRB corresponding to the network slice may be a DRB "common" to the terminal devices B, C, D. and E that work in a same network slice on the radio access network device side. For example, the terminal device E working in a network slice 1 on the radio access network device side may communicate with the radio access network device 100 by using a DRB that corresponds to the network slice 1 and that is for the terminal device B, C, or D on the radio access network device side. For a same network slice, the terminal devices E, B, C, and D share a DRB corresponding to the network slice on the radio access network device side.

Figure 2B:
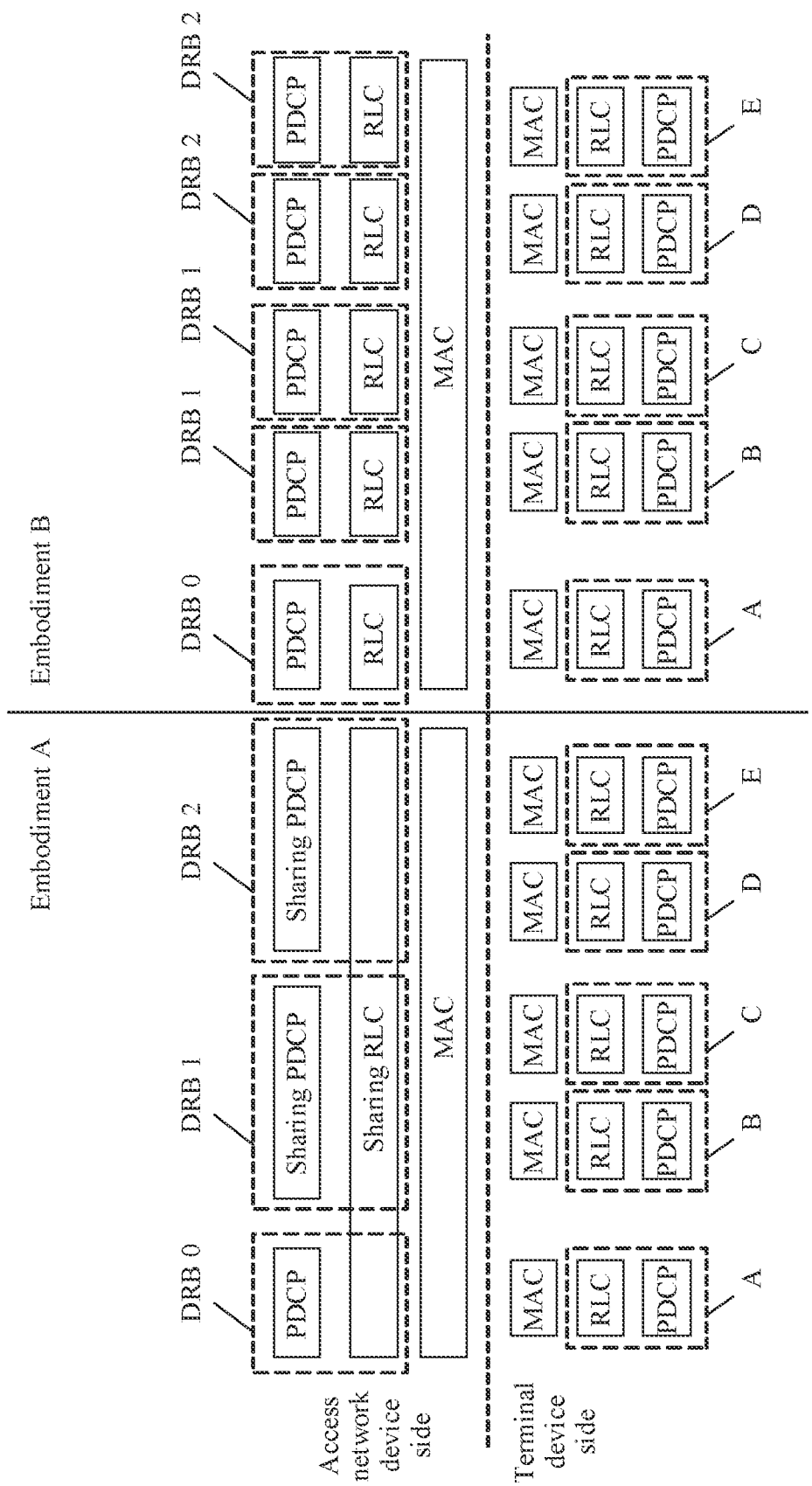
FIG. 2B is a schematic flowchart of a communication method according to an embodiment of this application.

Optionally, in an example embodiment A shown in FIG. 2B, the radio access network device 100 generates, on the radio access network device side, a DRB corresponding to a sharing network slice for the terminal devices E, B, C, and D, and the DRB may be a "unified DRB". For example, after the radio access network device 100 generates a DRB corresponding to a network slice on the radio access network device side, if the terminal devices B, C, and D subsequently intend to work on the DRB corresponding to the network slice, because the DIM that corresponds to the network slice and that is generated by the radio access network device 100 on the radio access network device side may be shared by the terminal devices B, C, and D, the terminal devices B, C, and D may directly communicate with the radio access network device by using the DRB corresponding to the network slice on the radio access network device side.

Optionally, in an example embodiment B shown in FIG. 2B, the radio access network device 100 generates DRBs corresponding to network slices for the terminal devices E, B, C, and D, and the DRBs may be "UE-specific DRBs". For example, the radio access network device 100 generates a DRB corresponding to a network slice for the terminal device E on the radio access network device side. If the terminal devices B, C, and D subsequently intend to work on DRBs corresponding to the network slice, the radio access network device 100 further needs to generate the DRBs that correspond to the network slice and that correspond to the terminal devices B, C, and D. DRB configuration information used by the radio access network device 100 to configure the DRBs corresponding to the network slice for the terminal device E and the terminal devices B, C, and D may be the same. For example, in the DRB configuration information that corresponds to the network slice and that is for the terminal device E and the terminal devices B, C, and D, one or more of quality of service QoS requirements, control resource sets, physical uplink control channel resources, physical uplink shared channel resources, random access preambles, transmission priorities, logical channel identifiers, identifiers of the data radio bearers, and configuration information of all protocol layers of the data radio bearers may be the same for the same network slice. The configuration information of all the protocol layers of the data radio bearers may include one or more of the following: a PDCP layer configuration, an RLC layer configuration, a MAC layer configuration, or a PHY configuration. The quality of service QoS requirement may include a QoS profile, and the QoS profile may include a quality of service flow identifier (QFI) and a corresponding QoS parameter.

Figure 3:
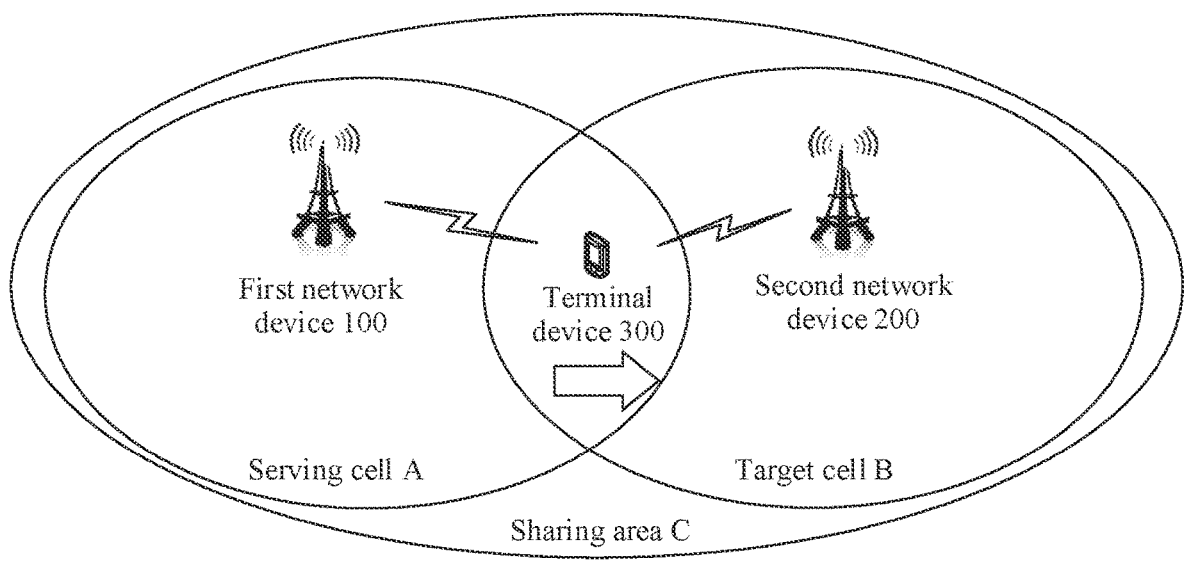
FIG. 3 is a schematic flowchart of a communication method according to an embodiment of this application.

FIG. 3 is a schematic diagram of a method of a sharing area based on a DRB corresponding to a network slice according to this application. As shown in FIG. 3, a terminal device 300 moves from a serving cell A of a first radio access network device 100 to a serving cell B of a second radio access network device 200. The first radio access network device 100, the second radio access network device 200, the cell A, and the cell B are in a same sharing area C. The first radio access network device 100 allocates, to the terminal device 300, configuration information of a DRB corresponding to a network slice, and allocates, to the terminal device 300, an identifier that is of the sharing area C and that corresponds to the network slice. When the terminal device performs base station handover or reselection or cell handover or reselection between base stations or cells in the sharing area C, the terminal device does not need to re-obtain and establish a DRB corresponding to a sharing network slice. For example, the terminal device 300 communicates with the first radio access network device 100 in the serving cell A by using a DRB that corresponds to the network slice and that is configured by the first radio access network device 100. When the terminal device 300 moves to the serving cell B, the terminal device may communicate with the second radio access network device 200 in the serving cell B by still using the DRB that corresponds to the network slice and that is configured by the first radio access network device 100.

The following describes this application in more detail with reference to the following embodiments.

Figure 4:
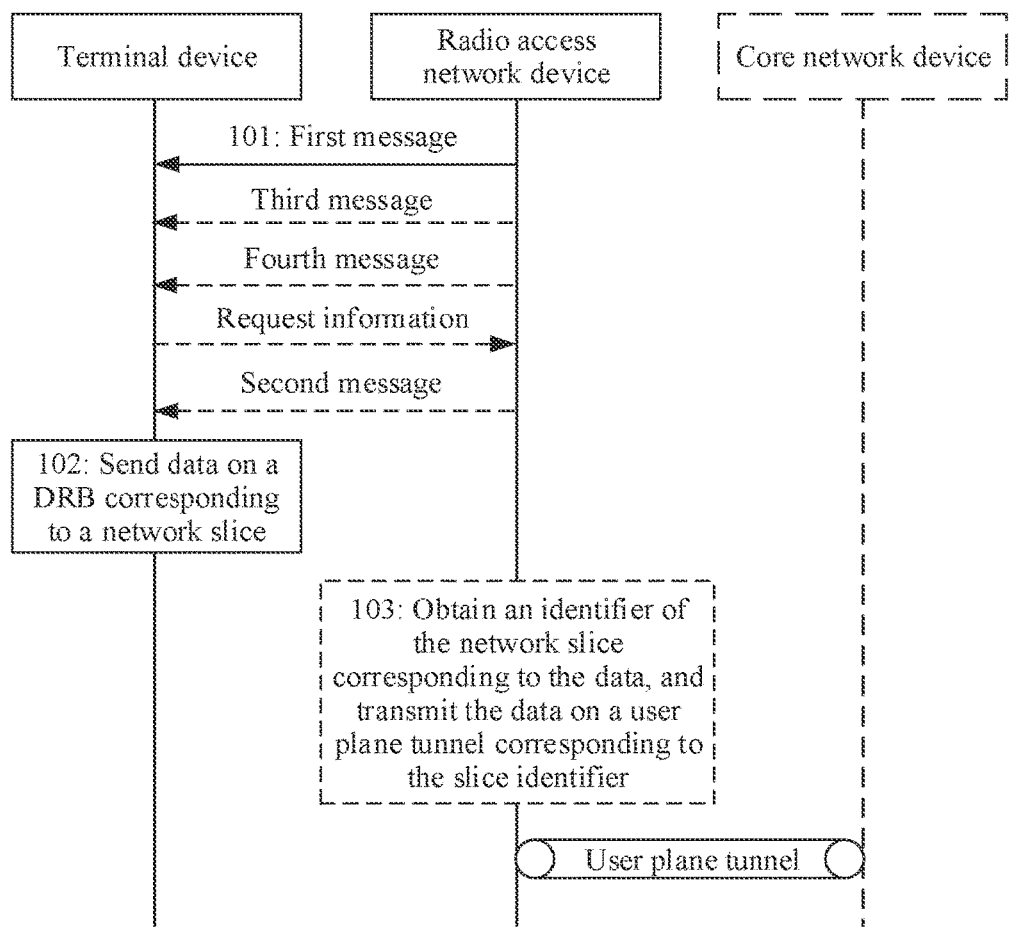
FIG. 4 is a schematic flowchart of a communication method according to an embodiment of this application.

FIG. 4 is a schematic flowchart of a communication method according to this application. The following specifically describes the technical solution in the embodiments of this application with reference to FIG. 4. For example, the communication method 100 corresponding to FIG. 4 may include the following steps.

Operation 101: A radio access network device sends a first message to a terminal device.

The radio access network device sends the first message to the terminal device, where the first message includes an identifier of a network slice and configuration information of a data radio bearer (DRB) corresponding to the identifier of the network slice.

Optionally, if network slices are not in a one-to-one correspondence with data radio bearers (DRBs), for example, all network slices correspond to a same DRB, the first message may not include identifiers of the network slices, or the first message includes configuration information of the DRBs corresponding to all the network slices. For example, the radio access network device broadcasts DRB-ConfigforSlicing in a broadcast message, where DRBConfigforSlicing includes DRB configuration information. That is, data of all the network slices may be transmitted by using a common preconfigured DRB. To enable a base station side to identify a network slice to which data belongs, the UE may include a network slice identifier in the uplink data, for example, include the network slice identifier in a MAC subheader. Conversely, when sending downlink data to the UE, the radio access network device may also include a network slice identifier. For another example, the radio access network device broadcasts DRBConfigforSlicing and SlicingList in a broadcast message, where SlicingList includes a list of all network slice identifiers applicable to DRBConfigforSlicing. That is, only data corresponding to a network slice identifier that appears in SlicingList may be sent to the radio access network device by using a preconfigured DRB.

In addition to the broadcast message, for the terminal device in a connected state, the radio access network device may further send the identifier of the network slice and the corresponding configuration information of the DRB to the terminal device in the connected state by using an RRC message, for example, an RRC reconfiguration message.

In a possible case, the terminal device in the connected state first sends a first request message to the radio access network device, where the first request message may include the identifier of the network slice. The first request message is used to request the radio access network device to send the configuration information of the DRB corresponding to the identifier of the network slice. In another possible case, the terminal device in the connected state first sends the identifier of the network slice and a first indication to the radio access network device, where the first indication is used to indicate the radio access network device to send configuration information of the DRB corresponding to the identifier of the network slice. After receiving the foregoing request or indication of the terminal device in the connected state, the radio access network device sends, to the terminal device, the configuration information of the DRB corresponding to the identifier of the network slice.

For example, the configuration information of the data radio bearer may include one or more of the following: a dedicated logical channel identifier (LCID) of the network slice, an identifier of the data radio bearer, and configuration information of all protocol layers of the data radio bearer, a quality of service (QoS) requirement of the network slice, a control resource set (CORESET) of the network slice, a physical uplink control channel (PUCCH) resource of the network slice, a physical uplink shared channel (PUSCH) resource of the network slice, a random access preamble of the network slice, and a transmission priority of the network slice. The configuration information of all the protocol layers of the DRB includes one or more of the following: a PDCP layer configuration, an RLC layer configuration, a media access control (MAC) layer configuration, or a physical (PHY) layer configuration.

For example, the radio access network device may use LCIDs 1, 2, and 3 to correspond to network slices 1, 2, and 3 respectively. Subsequently, the radio access network device may determine an identifier of a corresponding network slice by identifying an LCID carried in data. For example, the radio access network device first determines whether the terminal device has established an RRC connection. If the terminal device sends, when the terminal device has not established an RRC connection to the base station, uplink data that carries the logical channel identifiers 1, 2, and 3, the radio access network device may identify identifiers of the corresponding network slices based on the logical channel identifiers. For the terminal device in the connected state, assuming that the radio access network device reserves LCIDs 1, 2, and 3 for use of the network slices 1, 2, and 3, an LCID corresponding to a DRB dedicated to the terminal device in the connected state starts from a sequence number 4. Therefore, the radio access network device may alternatively identify an identifier of a corresponding network slice by using a logical channel identifier carried in uplink data.

Because uplink carriers may include a normal uplink (UL) carrier and a supplementary uplink (SUL) carrier, the configuration information of the data radio bearer in this application may include configuration information of a data radio bearer on an uplink carrier, and/or configuration information of a data radio bearer on a supplementary uplink (SUL) carrier.

Communication between a terminal device and a network device may be unicast communication, multicast communication, or broadcast communication. Therefore, the configuration information of the data radio bearer in this application may include configuration information of a data radio bearer for unicast communication and/or configuration information of a data radio bearer for multicast communication. Correspondingly, the data radio bearer corresponding to the network slice in this application may include a data radio bearer that is of the network slice and that corresponds to unicast communication and/or a data radio bearer that is of the network slice and that corresponds to multicast communication.

Optionally, the configuration information of the DRB may further include a network slice sharing identifier, and the network slice sharing identifier is used to identify a plurality of terminal devices in a sharing area when the radio access network device performs multicast communication with the plurality of terminal devices by using the data radio bearer. For example, the network slice sharing identifier may be used to scramble a multicast service corresponding to a downlink network slice within a cell range or a sharing area range.

Optionally, the configuration information of the DRB further includes a set of cells or radio access network devices in the sharing area. The set of cells or radio access network devices may be a set of cells or base stations that send a same sharing area identifier.

Optionally, the first message is not sent periodically all the time. For example, the first message is sent only at the request (on demand) of the terminal device.

Optionally, each time the terminal device moves to coverage of a new radio access network device, the terminal device may request configuration information of a DRB corresponding to a network slice. For example, the radio access network device may send a second message to the terminal device, where the second message includes first indication information, and the first indication information may be used to indicate whether the first message is sent. If the first indication information indicates that the first message is not sent, the terminal device may send request information to the radio access network device, where the request information is used to request the radio access network device to send the first message.

Optionally, each time the terminal device moves to coverage of a new radio access network device, the terminal device may request, only when a specific condition is met, configuration information of a DRB corresponding to a network slice. The condition may be as follows:

For example, the radio access network device further sends a third message to the terminal device, where the third message may include an identifier of the sharing area. As shown by a broadcast message format 1 in Table 1, the sharing area may correspond to all network slices, that is, all cells in the sharing area broadcast only a same identifier of the sharing area, and the sharing area identifier corresponds to all network slice identifiers. For example, in the sharing area, same network slices have same DRB configuration information. Alternatively, as shown by a broadcast message format 2 in Table 1, the sharing area may correspond to a specific network slice identifier, that is, each cell broadcasts one or more identifiers of the sharing area that separately correspond to one or more network slice identifiers. Different network slice identifiers may correspond to a same sharing area identifier or may correspond to different sharing area identifiers. For example, network slices corresponding to all network slice identifiers corresponding to a same sharing area identifier have a same DRB configuration.

TABLE 1

| Broadcast message format 1 | Broadcast message format 2 |
|---|---|
| >Sharing area identifier | >DRB configuration list |
| >DRB configuration list | >>Network slice identifier S-NSSAI |
| >>Network slice identifier S-NSSAI | >>DRB configuration |
| >>DRB configuration | >>Sharing area identifier |

Table 1 shows only several possible cases. One form of the network slice identifier is single network slice selection assistance information S-NSSAI (Single Network Slice Selection Assistance Information). A format of the foregoing broadcast message is not limited to the cases shown in Table 1. For example, the sharing area identifier may alternatively be a sharing area identifier list. Details are not described herein.

Optionally, the third message may alternatively include an identifier of the sharing area and the identifier of the network slice. When the sharing area corresponds to all network slice identifiers, the third message may include only the identifier of the sharing area. After receiving the third message, the terminal device may compare the sharing area corresponding to the network slice with a sharing area corresponding to a network slice and previously received and stored in another cell. If the sharing areas are the same, the terminal device does not need to request the first message. If the sharing areas are different, the terminal device needs to request the first message, to obtain the configuration information of the data radio bearer corresponding to the network slice in the current sharing area.

Optionally, the radio access network device sends a fourth message to the terminal device, where the fourth message includes second indication information, and the second indication information is used to indicate whether the DRB corresponding to the network slice is a data radio bearer in the sharing area. For example, for configuration information of a DRB 1 corresponding to a network slice 1 and configuration information of a DRB 2 corresponding to a network slice 2, the network slice 1 corresponds to a second indication and the network slice 2 corresponds to no second indication, or a second indication corresponding to the network slice 1 is true and a second indication corresponding to the network slice 2 is false. This indicates that the configuration information of the DRB 1 corresponding to the network slice 1 is the same in the sharing area, and the configuration information of the DRB 2 corresponding to the network slice 2 applies only in a cell. If the first indication information indicates that the first message is not sent, and the second indication information indicates that the DRB is not a data radio bearer in the sharing area (where for example, a configuration of the DRB applies only in a cell), the terminal device sends request information to the radio access network device, where the request information is used to request the radio access network device to send the first message. If the first indication information indicates that the first message is not sent, and the second indication information indicates that the data radio bearer is a data radio bearer in the sharing area, the sharing area corresponds to all network slice identifiers, or corresponds to the identifier of the network slice. When a sharing area identifier previously stored by the terminal device and corresponding to all the network slice identifiers or the identifier of the network slice is different from the identifier of the sharing area in the third message, the terminal device sends request information to the radio access network device, where the request information is used to request the radio access network device to send the first message. If an identifier of the sharing area corresponding to the identifier of the network slice is not stored for the first time, it may be set that the identifier of the sharing area that is stored by the terminal device and that is corresponding to all network slice identifiers or corresponding to the identifier of the network slice does not need to be compared with the identifier of the sharing area in the third message. In this way, the terminal device may send request information to the radio access network device, where the request information is used to request the radio access network device to send the first message. Whether the sharing area corresponds to all network slice identifiers or corresponds to the identifier of the network slice may be specified in a protocol or a standard, or may be preconfigured by using signaling. Details are not described herein.

Optionally, the radio access network device sends a fourth message to the terminal device, where the fourth message includes second indication information, and the second indication information is used to indicate whether the DRB corresponding to the network slice is a data radio bearer applicable within a sharing area range or a data radio bearer applicable within a cell range. For example, for configuration information of a DRB 1 corresponding to a network slice 1 and configuration information of a DRB 2 corresponding to a network slice 2, a second indication corresponding to the network slice 1 indicates that the DRB corresponding to the network slice is a data radio bearer applicable within the sharing area range and a second indication corresponding to the network slice 2 indicates that the DRB corresponding to the network slice is a data radio bearer applicable within the cell range, or a second indication corresponding to the network slice 1 is true and a second indication corresponding to the network slice 2 is false. This indicates that the configuration information of the DRB 1 corresponding to the network slice 1 is applicable in the sharing area, and the configuration information of the DRB 2 corresponding to the network slice 2 is applicable in a cell. If the first indication information indicates that the first message is not sent, and the second indication information indicates that the DRB corresponding to the network slice is a data radio bearer applicable within the cell range, the terminal device sends request information to the radio access network device, where the request information is used to request the radio access network device to send the first message. If the first indication information indicates that the first message is not sent, and the second indication information indicates that the DRB corresponding to the network slice is a data radio bearer applicable within the sharing area range, where the sharing area corresponds to all network slice identifiers or corresponds to the identifier of the network slice, after receiving the third message, the terminal device may compare the sharing area corresponding to the network slice with a sharing area corresponding to a network slice and previously received and stored in another cell. If the sharing areas are the same, the terminal device does not need to request the first message. If the sharing areas are different, the terminal device needs to request the first message, to obtain the configuration information of the data radio bearer corresponding to the network slice in the sharing area. If an identifier of the sharing area corresponding to the identifier of the network slice is not stored for the first time, it may be set that the identifier of the sharing area that is stored by the terminal device and that is corresponding to all network slice identifiers or corresponding to the identifier of the network slice does not need to be compared with the identifier of the sharing area in the third message. In this way, the terminal device may send request information to the radio access network device, where the request information is used to request the radio access network device to send the first message. Whether the sharing area corresponds to all network slice identifiers or corresponds to the identifier of the network slice may be specified in a protocol or a standard, or may be preconfigured by using signaling. Details are not described herein.

The "first message", the "second message", and the like in this application each may be a broadcast message, or may be dedicated signaling, for example, may be a layer 1 message, a layer 2 message, and a layer 3 message. For example, the layer 1 message generally refers to a. PHY layer message, the layer 2 message generally refers to signaling of a MAC layer, an RLC layer, or a PDCP layer, for example, a MAC control element (MAC CE) message, and the layer 3 message generally refers to signaling of an RRC layer or a non-access stratum (NAS) layer, for example, an RRC message or a NAS message. The "first message" and the "second message" in this application each may be some information elements (IEs) included in another message.

For example, the first message and the second message may be system information block (SIB) messages. For example, the second message may be a SIM message, and information included in the SIB1 message may belong to minimum system information (minimum SI) of a cell served by the radio access network device. The first message may belong to other system information (other SI) of the cell served by the radio access network device.

Optionally, if the first message is configured to be continuously broadcast, the radio access network device may not need to send the second message to the terminal device. For example, the first message belongs to the minimum SI of the cell served by the radio access network device. In this case, it may also be equivalently understood that when the first indication information indicates that the first message is not sent and the terminal device does not request the first message from the radio access network device, even if the first indication information indicates that the first message is sent, the terminal may choose to ignore or not to parse the first message.

Operation 102: The terminal device sends data to the radio access network device.

The terminal device may determine a corresponding data radio bearer based on a network slice to which the data belongs or the network slice corresponding to the data, and send the data to the radio access network device by using a logical channel corresponding to a logical channel identifier of the radio bearer. Correspondingly, the radio access network device may receive the data from the terminal device by using the logical channel corresponding to the logical channel identifier.

For example, when sending the data, the terminal device determines, based on the network slice corresponding to the data and a mapping relationship that is between a network slice identifier and a DRB configuration and that is sent by the radio access network device, the logical channel identifier of the DRB corresponding to the network slice. Then, the terminal device includes the logical channel identifier corresponding to the data radio bearer in a protocol layer header for encapsulating the data, for example, includes the logical channel identifier in a MAC header (or a MAC subheader). Correspondingly, the radio access network device may obtain, from the MAC header for encapsulating the data, the logical channel identifier corresponding to the data, and the radio access network device may find, based on the logical channel identifier included in the data, a corresponding RLC entity and a corresponding PDCP entity to perform data receiving and processing.

Operation 103: The radio access network device obtains an identifier of the network slice corresponding to the data, and transmits the data on a user plane tunnel that corresponds to the slice identifier and that is between the radio access network device and a core network device.

Because there is a correspondence between a network slice identifier, an LCID, and a DRB identifier, the radio access network device may find, based on any one of the identifiers, the user plane tunnel that corresponds to the network slice and that is between the radio access network device and the core network device, and subsequently, transmit the data on the user plane tunnel that corresponds to the network slice and that is between the radio access network device and a core network.

Optionally, the radio access network device obtains the identifier of the network slice based on the data radio bearer or an identifier of the data radio bearer, and then obtains the user plane tunnel that corresponds to the network slice and that is between the radio access network device and the core network device.

Optionally, the radio access network device may obtain, based on the logical channel identifier or the identifier of the DRB carried in the received data, an identifier that is of the network slice and that corresponds to the LCID or the identifier of the DRB, and then obtains the user plane tunnel that corresponds to the network slice and that is between the radio access network device and the core network device.

Optionally, the radio access network device obtains, based on the identifier of the network slice carried in the received data, the user plane tunnel that corresponds to the network slice and that is between the radio access network device and the core network device.

For example, if network slices and DRBs are in a one-to-one correspondence, the radio access network device obtains, based on the LCID or the DRB ID used to receive the data, the network slice corresponding to the LCID or the DRB ID, and transmits the data on a user plane tunnel that corresponds to an identifier of the network slice and that is between the radio access network device and the core network device.

For example, if network slices and DRBs are not in a one-to-one correspondence, the data uploaded by the terminal device needs to carry the identifier of the network slice. In this way, the radio access network device may transmit, based on the identifier of the network slice carried in the data, the data on the user plane tunnel that corresponds to the identifier of the network slice and that is between the radio access network device and the core network device.

Figure 5A:
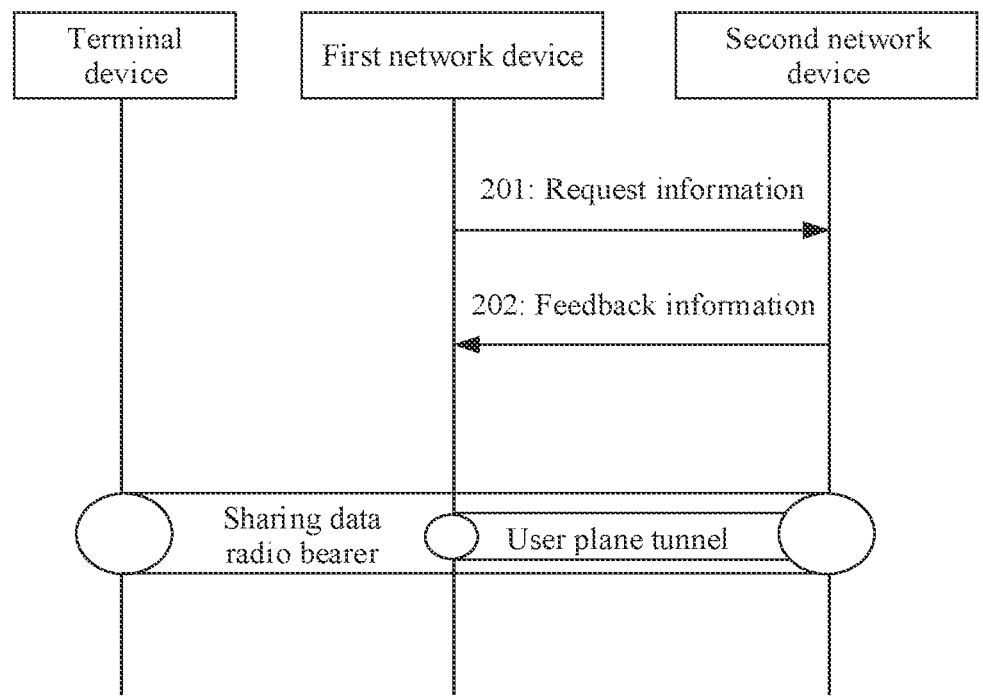
FIG. 5A is a schematic flowchart of a communication method according to an embodiment of this application.

FIG. 5A is a schematic flowchart of a communication method according to this application, The following specifically describes the technical solution in the embodiments of this application with reference to FIG. 5A. For example, the communication method 200 corresponding to FIG. 5A may include the following steps.

Operation 201: A first network device sends request information to a second network device.

The first network device has an RLC layer function, a MAC layer function, and a PHY function, and the second network device has a packet data convergence protocol PDCP layer function and an RRC layer function. The second network device may further include a service data adaptation protocol SDAP layer function. For example, the first network device may be a distributed unit (DU), the second network device may be a control unit (CU). and an interface for communication between the DU and the CU may be referred to as an F1 interface. The first network device and the second network device belong to a same radio access network device. The control unit CU may be further divided into a control unit-control plane CU-CP and a control unit-user plane CU-UP. The CU-CP has an RRC function and a PDCP function corresponding to a control plane, and the CU-UP has a PDCP function corresponding to a user plane. The CU-UP may also include an SDAP function.

The first network device sends the request information to the second network device, where the request message is used to establish a user plane tunnel that corresponds to a network slice identifier (or a data radio bearer identifier) and that is between the first network device and the second network device. The request information may include at least one of the network slice identifier, configuration information of a data radio bearer corresponding to the network slice identifier, and first general packet radio service tunneling protocol-user plane (GTP-U) tunnel address information, The first GTP-U tunnel address information may include a first Internet Protocol (IP) address and/or a first tunnel endpoint identifier (TEID), The user plane tunnel in this application is not limited to the GTP-U protocol, and is also applicable to another protocol. That is, user plane tunnel address information is exchanged between the first network device and the second network device.

The configuration information of the data radio bearer corresponding to the network slice identifier may be sent to the second network device in a form of cell group configuration information (CellGroupConfig), for example, in a form of a container. Alternatively, for example, an information element such as SharedRBConfigLowLayer is added to DU-to-CU RRC information. Optionally, the configuration information of the data radio bearer corresponding to the network slice identifier may alternatively be transparently transmitted on the F1 interface. For example, parameters included in the configuration information of the data radio bearer are explicitly specified on the F1 interface.

For example, the configuration information of the data radio bearer may include lower-layer configuration information of the data radio bearer, for example, configuration information of a PHY layer, a MAC layer, and an RLC layer. For example, the configuration information of the data radio bearer may not include configuration information of a higher layer such as a packet data convergence protocol PDCP layer.

The request information may be carried in an F1 setup request or a gNB-DU configuration update message. Optionally, the request message may further include indication information, where the indication information is used to indicate whether the user plane tunnel that corresponds to the network slice identifier (or the data radio bearer identifier) and that is requested to be established is a user plane unicast tunnel or a user plane multicast tunnel. For example, the indication information may be a multicast indication. When the multi cast indication is true or 1, the user plane tunnel is for multicast. When the multicast indication is false or 0, the user plane tunnel is for unicast. Alternatively, the user plane tunnel is for unicast by default, and only when indication information such as a multicast indication appears, it indicates that the user plane tunnel is for multicast. Alternatively, the indication information is a cast type, and includes two values: unicast and multicast. When a value is unicast, the indication information indicates unicast. When a value is multicast, the indication information indicates multicast. In this case, the first GTP-U tunnel address information may include first GTP-U unicast tunnel address information and/or first GTP-U multicast tunnel address information. Correspondingly, the configuration information of the data radio bearer corresponding to the network slice identifier may include configuration information of a unicast data radio bearer and/or configuration information of a multicast data radio bearer.

Operation 202: The second network device sends feedback information to the first network device.

The first network device receives the feedback information from the second network device, where the feedback information may include at least one of the network slice identifier, the configuration information of the data radio bearer corresponding to the network slice identifier, and corresponding second GTP-U tunnel address information.

The second GTP-U tunnel address information may include a second Internet Protocol (IP) address and/or a second tunnel endpoint identifier (TEID). Optionally, the second GTP-U tunnel address information may include second GTP-U unicast tunnel address information and/or second GTP-U multicast tunnel address information.

The first GTP-U tunnel address information and the second GTP-U tunnel address information are used to identify the user plane tunnel that corresponds to the network slice identifier (or the data radio bearer identifier) and that is between the first network device and the second network device.

If the user plane tunnel that corresponds to the network slice identifier (or the data radio bearer identifier) and that is between the first network device and the second network device is used for both uni cast and multicast data transmission, the second network device needs to include, in a GTP-U header of a downlink data packet, an indication indicating whether to perform multicast. For example, if there is no multicast indication (or a multicast indication is false), unicast is to be performed on corresponding data. If a multicast indication is included (or the multi cast indication is true), multicast is to be performed on corresponding data. After receiving a multicast indication, the first network device performs multicast transmission on a data radio bearer that corresponds to a network slice and that corresponds to multicast communication. After receiving a unicast indication, the first network device performs unicast transmission on a data radio bearer that corresponds to a network slice and that corresponds to unicast communication.

Optionally, the first GTP-U unicast tunnel address information and the second GTP-U uni cast tunnel address information are used to identify a user plane unicast tunnel that corresponds to the network slice identifier (or the data radio bearer identifier) and that is between the first network device and the second network device. The first GTP-U multicast tunnel address information and the second GTP-U multicast tunnel address information are used to identify a user plane multicast tunnel that corresponds to the network slice identifier (or the data radio bearer identifier) and that is between the first network device and the second network device.

If the first network device receives data from the user plane multicast tunnel, the first network device performs multicast transmission on the data radio bearer that corresponds to the network slice and that corresponds to the multicast communication. If the first network device receives data from the user plane unicast tunnel, the first network device performs unicast transmission on the data radio bearer that corresponds to the network slice and that corresponds to the unicast communication.

Figure 5B:
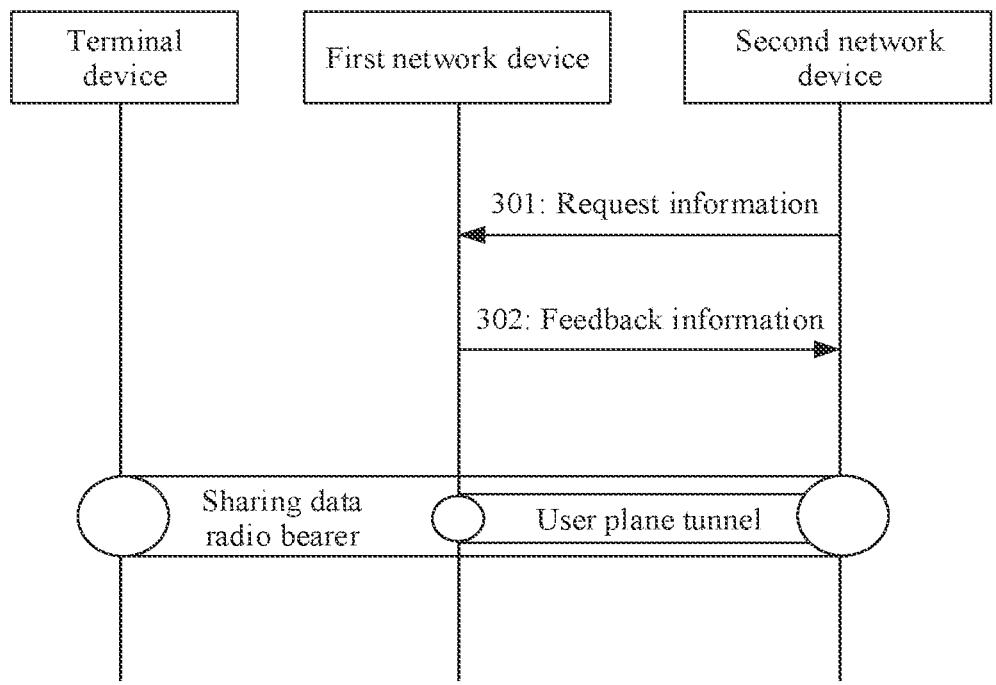
FIG. 5B is a schematic flowchart of a communication method according to an embodiment of this application.

FIG. 5B is a schematic flowchart of a communication method according to this application. The following specifically describes the technical solution in the embodiments of this application with reference to FIG. 5B. For example, the communication method 300 corresponding to FIG. 5B may include the following steps.

Operation 301: A second network device sends request information to a first network device.

The second network device sends the request information to the first network device, where the request message is used to establish a user plane tunnel that corresponds to a network slice identifier (or a data radio bearer identifier) and that is between the first network device and the second network device. The request information may include the network slice identifier and first general packet radio service tunneling protocol-user plane (GTP-U) tunnel address information. The first GTP-U tunnel address information may include a first IP address and/or a first TEID.

The request information may be carried in a gNB-CU configuration update message. Optionally, the request message further includes indication information, where the indication information is used to indicate whether the user plane tunnel that corresponds to the network slice identifier (or the data radio bearer identifier) and that is requested to be established is a user plane unicast tunnel or a user plane multicast tunnel. In this case, the first GTP-U tunnel address information may include first GTP-U unicast tunnel address information and/or first GTP-U multicast tunnel address information. Optionally, the request message further includes indication information, where the indication information is used to indicate a priority of the established user plane tunnel that corresponds to the network slice identifier (or the data radio bearer identifier).

Operation 302: The first network device sends feedback information to the second, network device.

The second network device receives the feedback information from the first network device, where the feedback information includes the network slice identifier, second GTP-U tunnel address information, and the configuration information of the data radio bearer corresponding to the network slice identifier.

For example, the configuration information of the data radio bearer may include lower-layer configuration information of the data radio bearer, for example, configuration information of a PHY layer, a MAC layer, and an RLC layer. For example, the configuration information of the data radio bearer may not include configuration information of a higher layer such as a packet data convergence protocol PDCP layer.

The second GTP-U tunnel address information may include a second IP address and/or a second TEID. Optionally, the second GTP-U tunnel address information may include second GTP-U unicast tunnel address information and/or second GTP-U multicast tunnel address information. Correspondingly, the configuration information of the data radio bearer corresponding to the network slice identifier may include configuration information of a unicast data radio bearer and/or configuration information of a multicast data radio bearer.

The first GTP-U tunnel address information and the second GTP-U tunnel address information are used to identify the user plane tunnel that corresponds to the network slice identifier (or the data radio bearer identifier) and that is between the first network device and the second network device.

If the user plane tunnel that corresponds to the network slice identifier (or the data radio bearer identifier) and that is between the first network device and the second network device is used for both unicast and multicast data transmission, the second network device needs to include, in a GTP-U header of a downlink data packet, an indication indicating whether to perform multicast. After receiving a multicast indication, the first network device performs multicast transmission on a data radio bearer that corresponds to a network slice and that corresponds to multicast communication. After receiving a unicast indication, the first network device performs unicast transmission on a data radio bearer that corresponds to a network slice and that corresponds to unicast communication.

Optionally, the first GTP-U unicast tunnel address information and the second GTP-U unicast tunnel address information are used to identify a user plane unicast tunnel that corresponds to the network slice identifier (or the data radio bearer identifier) and that is between the first network device and the second network device. The first GTP-U multicast tunnel address information and the second GTP-U multicast tunnel address information are used to identify a user plane multicast tunnel that corresponds to the network slice identifier (or the data radio bearer identifier) and that is between the first network device and the second network device.

If the first network device receives data from the user plane multicast tunnel, the first network device performs multicast transmission on the data radio bearer that corresponds to the network slice and that corresponds to the multicast communication. If the first network device receives data from the user plane unicast tunnel, the first network device performs unicast transmission on the data radio bearer that corresponds to the network slice and that corresponds to the unicast communication.

Figure 5C:
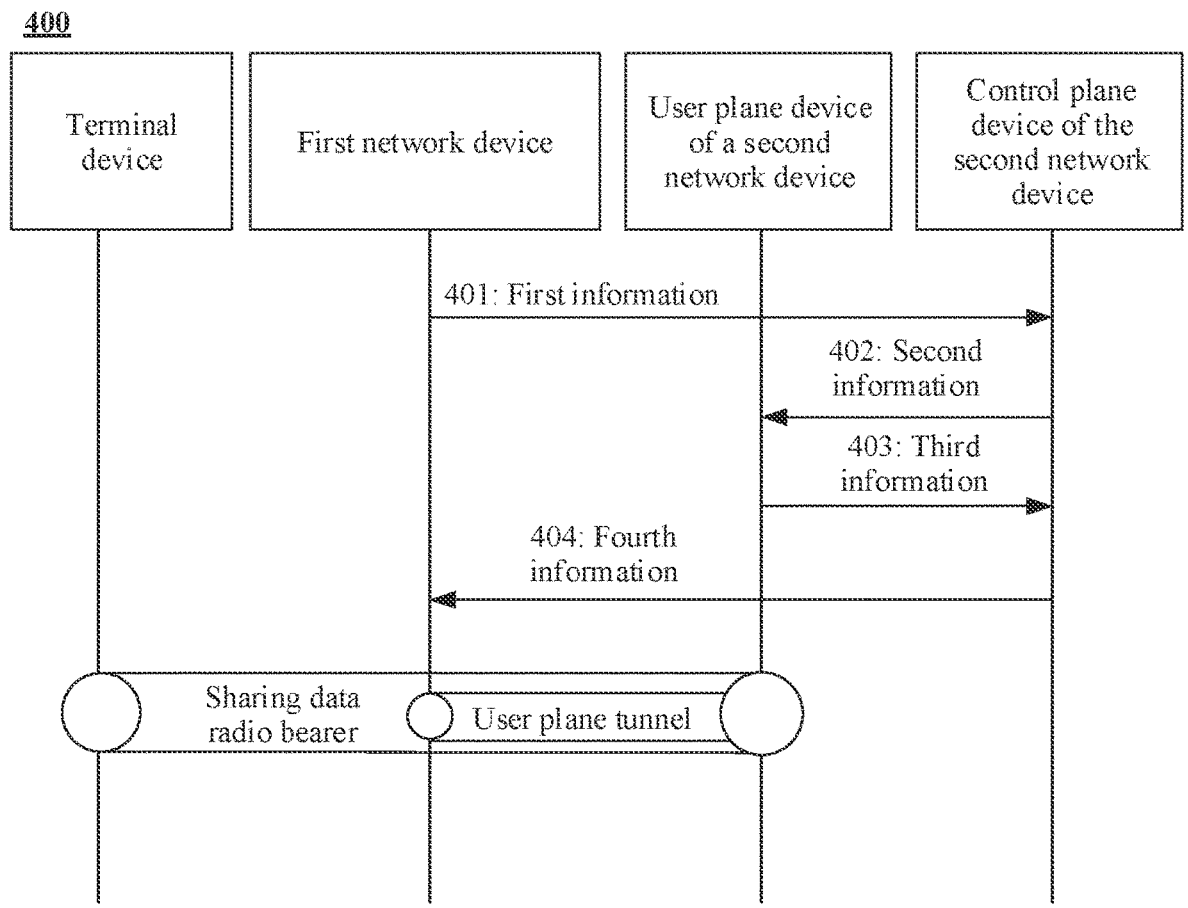
FIG. 5C is a schematic flowchart of a communication method according to an embodiment of this application.

FIG. 5C is a schematic flowchart of a communication method according to this application. The following specifically describes the technical solution in the embodiments of this application with reference to FIG. 5C. For example, the communication method 400 corresponding to FIG. 5C may include the following steps.

Operation 401: A first network device sends first information to a control plane device of a second network device.

The first information may include a network slice identifier and a GTP-U tunnel address on a DU side.

Operation 402: The control plane device of the second network device sends second information to a user plane device of the second network device.

The second information is used to request to establish a user plane tunnel that corresponds to the network slice identifier (or a data radio bearer identifier) and that is between the first network device and the user plane device of the second network device. The second information may include the network slice identifier and GTP-U tunnel address information on the DU side.

Optionally, the second information may further include indication information, where the indication information is used to indicate whether the user plane tunnel that corresponds to the network slice identifier (or the data radio bearer identifier) and that is requested to be established is a user plane unicast tunnel or a user plane multicast tunnel. In this case, the GTP-U tunnel address information on the DU side may include GTP-U unicast tunnel address information on the DU side and/or GTP-U multicast tunnel address information on the DU side. Optionally, the second information further includes indication information, where the indication information is used to indicate a priority of the established user plane tunnel that corresponds to the network slice identifier (or the data radio bearer identifier).

Operation 403: The user plane device of the second network device sends third information to the control plane device of the second network device.

The third information may include the network slice identifier and GTP-U tunnel address information on a CU side.

Operation 404: The control plane device of the second network device sends fourth information to the first network device.

The fourth information may include the network slice identifier and the GTP-U tunnel address information on the CU side. The GTP-U tunnel address information on the CU side and the GTP-U tunnel address information on the DU side may be used to identify the user plane tunnel that corresponds to the network slice identifier (or the data radio bearer identifier) and that is between the first network device and the user plane device of the second network device.

Figure 5D:
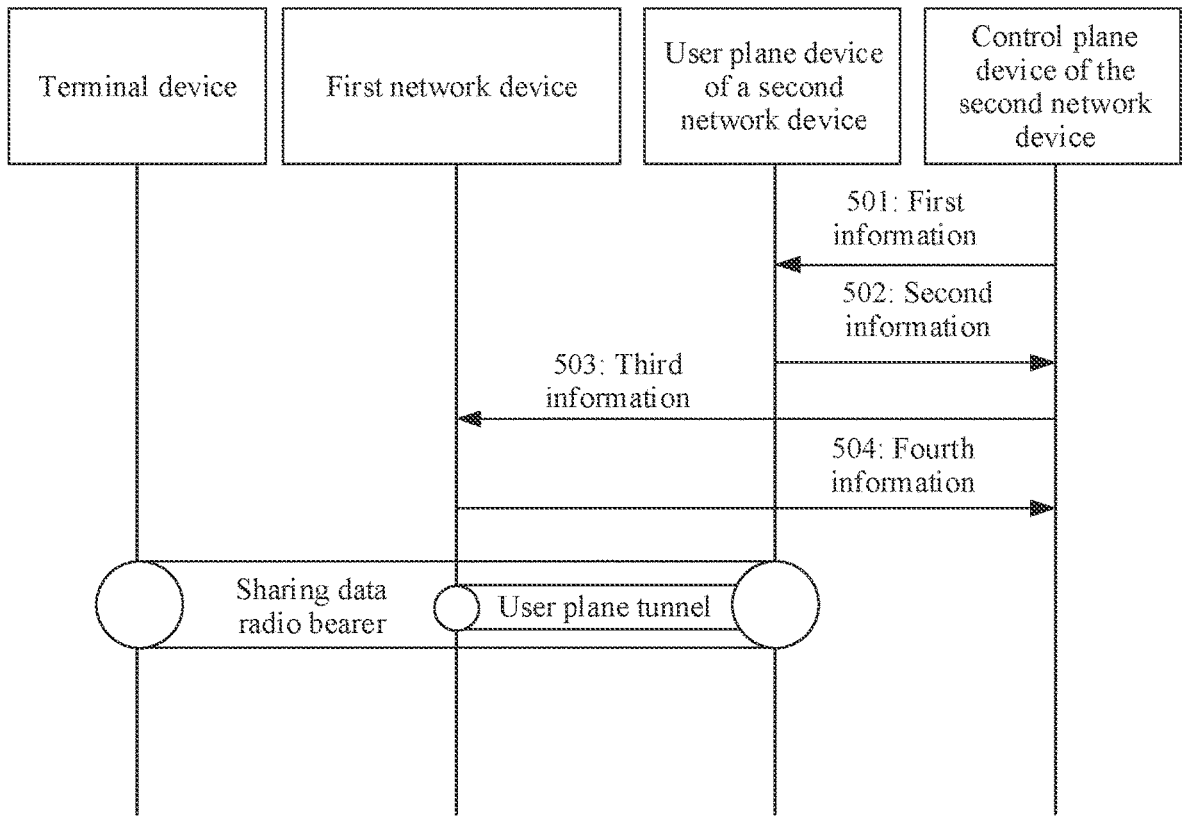
FIG. 5D is a schematic flowchart of a communication method according to an embodiment of this application.

FIG. 5D is a schematic flowchart of a communication method according to this application. The following specifically describes the technical solution in the embodiments of this application with reference to FIG. 5D. For example, the communication method 500 corresponding to FIG. 5D may include the following steps.

Operation 501: A control plane device of a second network device sends first information to a user plane device of the second network device.

The first information is used to request to establish a user plane tunnel that corresponds to a network slice identifier or a data radio bearer identifier and that is between a first network device and the user plane device of the second network device. The first information may include the network slice identifier.

Optionally, the first information may further include indication information, where the indication information is used to indicate whether the user plane tunnel that corresponds to the network slice identifier (or the data radio bearer identifier) and that is requested to be established is a user plane unicast tunnel or a user plane multicast tunnel. Optionally, the first information further includes indication information, where the indication information is used to indicate a priority of the established user plane tunnel that corresponds to the network slice identifier (or the data radio bearer identifier).

Operation 502: The user plane device of the second network device sends second information to the control plane device of the second network device.

The second information may include the network slice identifier and GTP-U tunnel address information on a CU side.

Operation 503: The control plane device of the second network device sends third information to the first network device.

The third information may include the network slice identifier and the GTP-U tunnel address information on the CU side.

Operation 504: The first network device sends fourth information to the control plane device of the second network device.

The fourth information may include the network slice identifier and GTP-U tunnel address information on a DU side. The GTP-U tunnel address information on the DU side and the GTP-U tunnel address information on the CU side may be used to identify the user plane tunnel that corresponds to the network slice identifier (or the data radio bearer identifier) and that is between the first network device and the user plane device of the second network device.

Figure 6A:
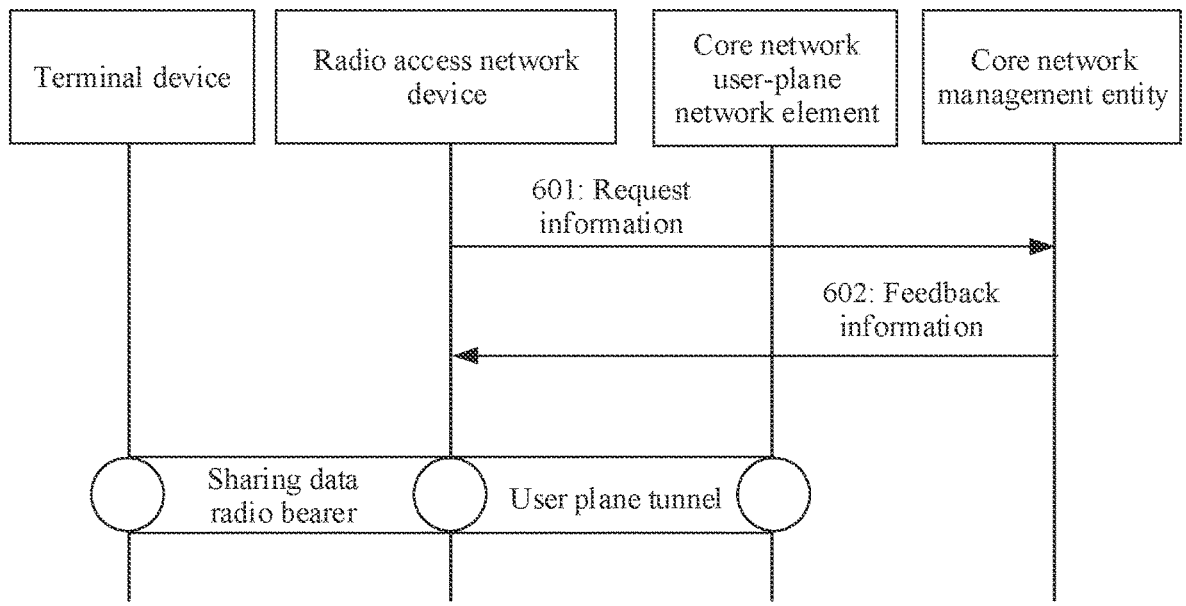
FIG. 6A is a schematic flowchart of a communication method according to an embodiment of this application.

FIG. 6A is a schematic flowchart of a communication method according to this application. The following specifically describes the technical solution in the embodiments of this application with reference to FIG. 6A. For example, the communication method 600A corresponding to FIG. 6A may include the following steps.

Operation 601: A radio access network device sends request information to a core network management entity.

The radio access network device sends the request information to the core network management entity, where the request information is used to establish a user plane tunnel that corresponds to a network slice identifier and that is between the radio access network device and a core network user-plane network element (UPF). The request message may include a network slice identifier and first GTP-U tunnel address information. For an LTE system, the core network user-plane network element is a serving gateway (SGW).

The core network management entity may be a mobility management entity (MME) in the LTE system, or may be an access and mobility management network element (AMF) in an NR system.

The NR system is used as an example. The request message may be carried in a next generation (NG) setup request or a RAN configuration update message. Optionally, the request message further includes indication information, where the indication information is used to indicate whether the user plane tunnel that corresponds to the network slice identifier and that is requested to be established is a user plane unicast tunnel or a user plane multi cast tunnel.

Operation 602: The core network management entity sends feedback information to the radio access network device.

The core network management entity sends the feedback information to the radio access network device, where the feedback information includes the network slice identifier and second GTP-U tunnel address information.

The first GTP-U tunnel address information and the second GTP-U tunnel address information are used to identify a user plane tunnel that corresponds to the identifier of the network slice and that is between the radio access network device and the core network user-plane network element.

Figure 6B:
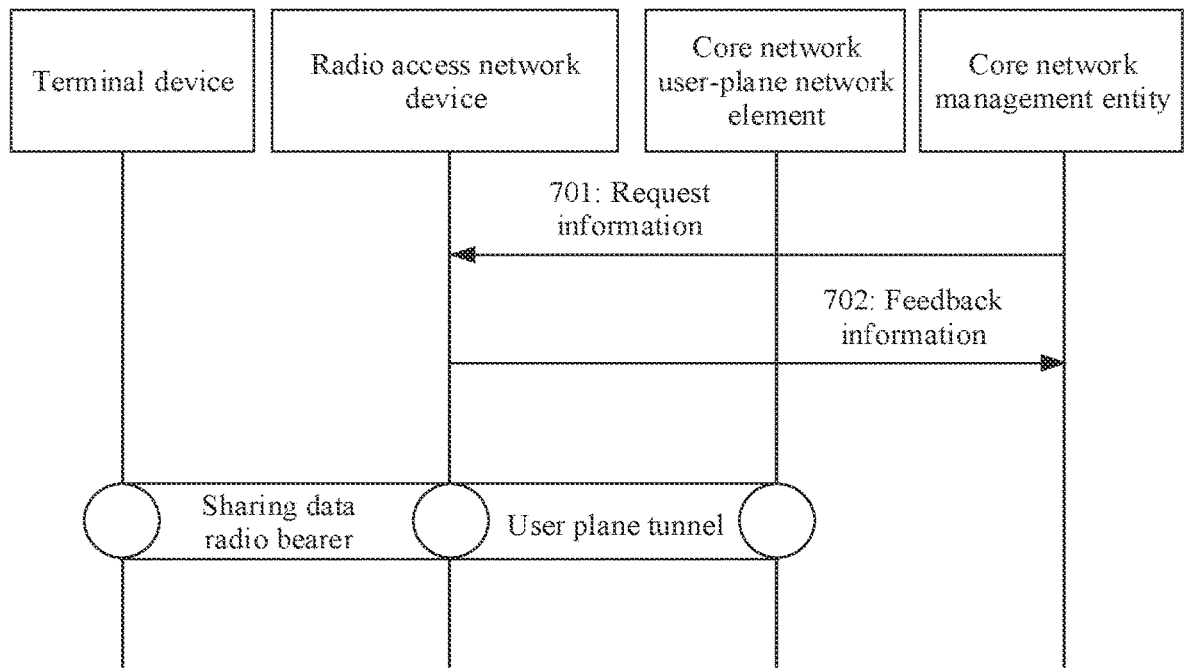
FIG. 6B is a schematic flowchart of a communication method according to an embodiment of this application.

FIG. 6B is a schematic flowchart of a communication method according to this application. The following specifically describes the technical solution in the embodiments of this application with reference to FIG. 6B. For example, the communication method 600B corresponding to FIG. 6B may include the following steps.

Operation 701: A core network management entity sends request information to a radio access network device.

The core network management entity sends the request information to the radio access network device, where the request message is used to establish a user plane tunnel that corresponds to a network slice identifier and that is between the radio access network device and the core network user-plane network element (UPF). The request message may include the network slice identifier and first GTP-U tunnel address information. An NR system is used as an example. The request information may be carried in an AMF configuration update message.

Optionally, the request information further includes indication information, where the indication information is used to indicate whether the user plane tunnel that corresponds to the network slice identifier and that is requested to be established is a user plane unicast tunnel or a user plane multicast tunnel.

Operation 702: The radio access network device sends feedback information to the core network management entity.

The radio access network device sends the feedback information to the core network management entity, where the feedback information includes the network slice identifier and second GTP-U tunnel address information.

The first GTP-U tunnel address and the second GTP-U tunnel address are used to identify a user plane tunnel that corresponds to the identifier of the network slice and that is between the radio access network device and the core network user-plane network element.

In the foregoing embodiments, the description of each embodiment has respective focuses. For a part that is not described in detail in an embodiment, refer to related descriptions in other embodiments.

Based on the foregoing similar technical concepts, the embodiments of this application provide a terminal device or a network device. The terminal device or the network device may be the terminal device, the radio access network device, the first network device, the second network device, or the core network management entity in the communication methods and any possible design thereof provided in all of the foregoing method embodiments. The terminal device or the network device may include at least one corresponding unit configured to perform a method step, an operation, or a behavior performed by the terminal device or the network device in the communication methods provided in all of the foregoing method embodiments. The at least one unit may be configured to be in a one-to-one correspondence with the method step, the operation, or the behavior performed by the terminal device or the network device.

Figure 7:
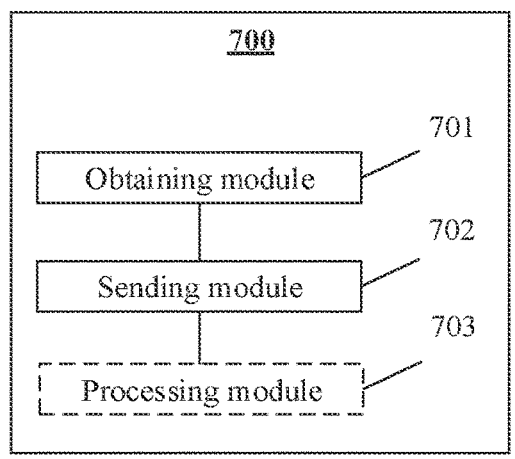
FIG. 7 is a schematic block diagram of a network device according to an embodiment of this application.

For example, the following specifically describes a structure and a function of a terminal device 700 with reference to FIG. 7 in the embodiments of this application. FIG. 7 is a schematic block diagram of the terminal device 700 according to an embodiment of this application.

For example, this application provides a terminal device 700. The terminal device may include: an obtaining module 701, configured to receive a first message from a radio access network device, where the first message includes an identifier of a network slice and configuration information of a data radio bearer corresponding to the identifier of the network slice; and a sending module 702, configured to send data to the radio access network device by using the data radio bearer, where the data corresponds to the network slice.

Optionally, the configuration information of the data radio bearer includes a logical channel identifier and/or an identifier of the data radio bearer.

Optionally, the terminal device 700 determines the data radio bearer based on the network slice corresponding to the data, and sends the data to the radio access network device by using the data radio bearer, where the data carries the logical channel identifier.

Optionally, the obtaining module 701 is configured to receive a second message from the radio access network device before the obtaining module 701 receives the first message, where the second message includes first indication information, and the first indication information is used to indicate whether the first message is sent.

Optionally, the first indication information indicates that the first message is not sent. The sending module 702 is configured to send request information to the radio access network device, where the request information is used to request the radio access network device to send the first message.

Optionally, the first indication information indicates that the first message is not sent. The obtaining module 701 is configured to receive a third message, where the third message includes an identifier of a sharing area, and the sharing area corresponds to all network slices, or the sharing area corresponds to the identifier of the network slice.

Optionally, the obtaining module 701 is configured to receive a fourth message, where the fourth message includes second indication information, and the second indication information is used to indicate whether the data radio bearer is a data radio bearer in the sharing area.

Optionally, the second indication information indicates that the data radio bearer is not a data radio bearer in the sharing area. The sending module 702 is configured to send request information to the radio access network device, where the request information is used to request the radio access network device to send the first message.

Optionally, the terminal device 700 may further include a processing module 703. When the second indication information indicates that the data radio bearer is a data radio bearer in the sharing area, and the sharing area corresponds to the identifier of the network slice, the sharing area corresponds to all network slice identifiers, the processing module 703 learns, through comparison, that the identifier of the sharing area is different from a sharing area identifier previously stored by the terminal device 700 and corresponding to the identifier of the network slice. The processing module 703 indicates the sending module 702 to send request information to the radio access network device, where the request information is used to request the radio access network device to send the first message.

Figure 8:
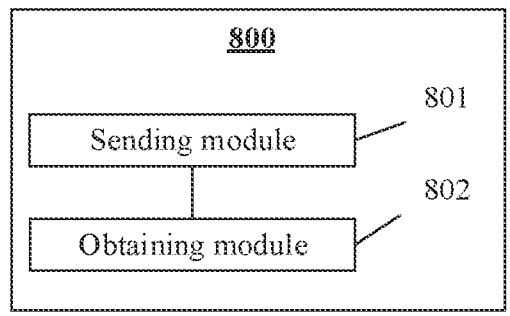
FIG. 8 is a schematic block diagram of a terminal device according to an embodiment of this application.

For example, the following specifically describes a structure and a function of a network device 800 with reference to FIG. 8 in the embodiments of this application. FIG. 8 is a schematic block diagram of the network device 800 according to an embodiment of this application.

For example, this application provides a network device 800. The network device may include: a sending module 801, configured to send a first message to a terminal device, where the first message includes an identifier of a network slice and configuration information of a data radio bearer corresponding to the network slice; and an obtaining module 802, configured to receive data from the terminal device by using the data radio bearer, where the data corresponds to the network slice.

Optionally, the configuration information of the data radio bearer includes a logical channel identifier and/or an identifier of the data radio bearer.

Optionally, the obtaining module 802 is further configured to obtain the data radio bearer based on the logical channel identifier carried in the received data and/or the identifier of the data radio bearer carried in the data.

Optionally, the obtaining module 802 is configured to obtain the identifier of the network slice based on the data radio bearer, and the sending module 801 is configured to transmit the data on a user plane tunnel that corresponds to the identifier of the network slice and that is between the radio access network device 800 and a core network device; or the sending module 801 is configured to transmit, based on the identifier of the network slice carried in the received data, the data on a user plane tunnel that corresponds to the identifier of the network slice and that is between the radio access network device 800 and a core network device.

Optionally, the sending module 801 is further configured to send a second message before the sending module 801 sends the first message, where the second message includes first indication information, and the first indication information is used to indicate whether the first message is sent.

Optionally, the first indication information indicates that the first message is not sent. The obtaining module 802 is configured to receive request information from the terminal device, where the request information is used to request to send the first message.

Optionally, the sending module 801 is configured to send a third message, where the third message includes an identifier of a sharing area, and the sharing area corresponds to all network slices, or the sharing area corresponds to the identifier of the network slice.

Optionally, the sending module 801 is configured to send a fourth message, where the fourth message includes second indication information, and the second indication information is used to indicate whether the data radio bearer is a data radio bearer in the sharing area.

For example, this application provides a first network device 800. The first network device may include: a sending module 801, configured to send request information to a second network device, where the request information includes an identifier of a network slice, configuration information of a data radio bearer corresponding to the identifier of the network slice, and first general packet radio service tunneling protocol-user plane (GTP-U) tunnel address information corresponding to the identifier of the network slice; and an obtaining module 802, configured to receive feedback information from the second network device, where the feedback information includes second GTP-U tunnel address information corresponding to the identifier of the network slice. The first GTP-U tunnel address information and the second GTP-U tunnel address information are used to identify a user plane tunnel that corresponds to the identifier of the network slice and that is between the first network device and the second network device. The first network device has a radio link control layer function, a media access control layer function, and a physical layer function, and the second network device has a packet data convergence protocol layer function and a radio resource control layer function.

Optionally, the GTP-U tunnel address information includes an Internet Protocol IP address and/or a tunnel endpoint identifier (TEID).

Optionally, the request information further includes indication information, and the indication information is used to indicate to request to establish a user plane unicast tunnel corresponding to the identifier of the network slice or a user plane multicast tunnel corresponding to the identifier of the network slice.

For example, this application provides a second network device 800. The second network device may include: an obtaining module 802, configured to receive request information from a first network device, where the request information includes an identifier of a network slice, configuration information of a data radio bearer corresponding to the identifier of the network slice, and first general packet radio service tunneling protocol-user plane (GTP-U) tunnel address information corresponding to the identifier of the network slice; and a sending module 801, configured to send feedback information to the first network device, where the feedback information includes second GTP-U tunnel address information corresponding to the identifier of the network slice. The first GTP-U tunnel address information and the second GTP-U tunnel address information are used to identify a user plane tunnel that corresponds to the identifier of the network slice and that is between the first network device and the second network device. The first network device has a radio link control layer function, a media access control layer function, and a physical layer function, and the second network device has a packet data convergence protocol layer function and a radio resource control layer function.

Optionally, the GTP-U tunnel address information includes an Internet Protocol IP address and/or a tunnel endpoint identifier (TEID).

Optionally, the request information further includes indication information, and the indication information is used to indicate to request to establish a user plane unicast tunnel corresponding to the identifier of the network slice or a user plane multicast tunnel corresponding to the identifier of the network slice.

For example, this application provides a core network management entity 800. The core network management entity may include: an obtaining module 802, configured to receive a request information from a radio access network device, where the request information includes an identifier of a network slice and first general packet radio service tunneling protocol-user plane (GTP-U) tunnel address information corresponding to the identifier of the network slice; and a sending module 801, configured to send second GTP-U tunnel address information corresponding to the identifier of the network slice to the radio access network device. The first GTP-U tunnel address information and the second GTP-U tunnel address information are used to identify a user plane tunnel that corresponds to the identifier of the network slice and that is between the radio access network device and a core network user-plane network element.

Optionally, the GTP-U tunnel address information includes an Internet Protocol IP address and/or a tunnel endpoint identifier (TEID).

Optionally, the request information further includes indication information, and the indication information is used to indicate to request to establish a user plane unicast tunnel corresponding to the identifier of the network slice or a user plane multicast tunnel corresponding to the identifier of the network slice.

For example, this application provides a radio access network device 800. The radio access network device may include: a sending module 801, configured to send a request message to a core network management entity, where the request message includes an identifier of a network slice and first general packet radio service tunneling protocol-user plane (GTP-U) tunnel address information corresponding to the identifier of the network slice; and an obtaining module 802, configured to receive second GTP-U tunnel address information corresponding to the identifier of the network slice from the core network management entity. The first GTP-U tunnel address information and the second GTP-U tunnel address information are used to identify a user plane tunnel that corresponds to the identifier of the network slice and that is between the radio access network device and a core network user-plane network element.

Optionally, the GTP-U tunnel address information includes an Internet Protocol IP address and/or a tunnel endpoint identifier (TEID).

Optionally, the request message further includes indication information, and the indication information is used to indicate to request to establish a user plane unicast tunnel corresponding to the identifier of the network slice or a user plane multicast tunnel corresponding to the identifier of the network slice.

It should be noted that the modules and units in the foregoing embodiments may be implemented by a computer program, may be implemented by a hardware circuit, or may be implemented by combining a computer program with a hardware circuit. For example, a receiving module and a sending module may be implemented by using a transceiver apparatus, an interface circuit, or a transceiver, or a receiving module is implemented by an independent receiver and a sending module is implemented by an independent receiver, and a processing module may be implemented by a processor with a data processing function.

Figure 9:
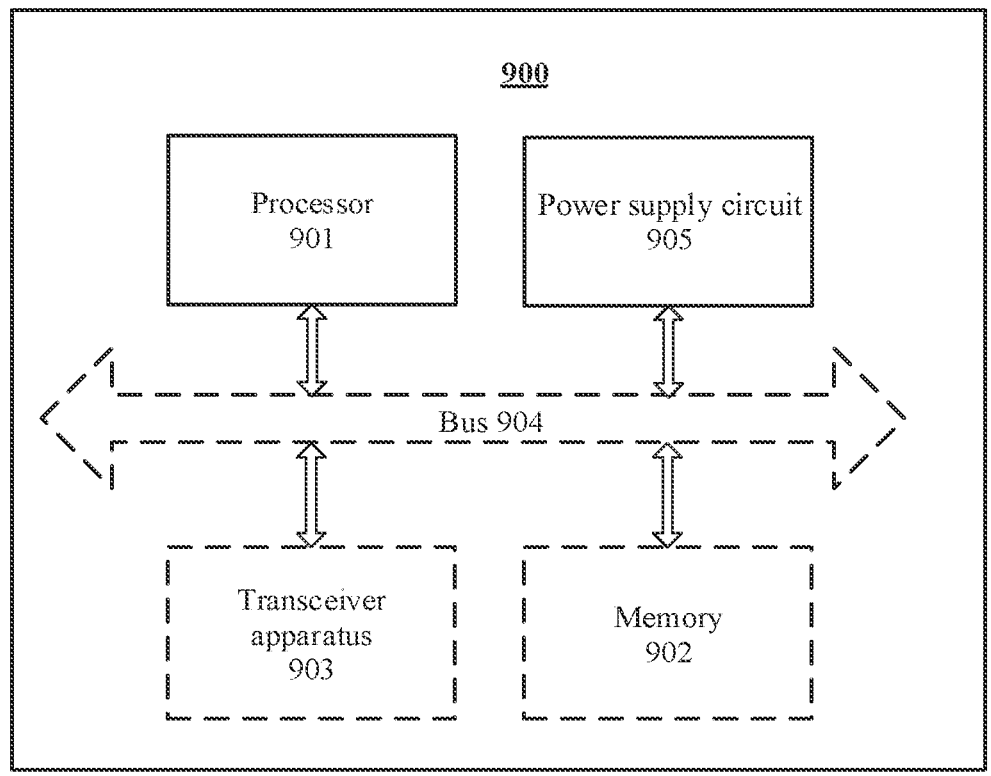
FIG. 9 is a schematic block diagram of a communication apparatus according to an embodiment of this application.

Based on a same technical concept, an embodiment of this application further provides a communication apparatus that may be configured to implement a function performed by any terminal device or any network device in the foregoing method embodiments. The following specifically describes a structure and a function of a communication apparatus 900 with reference to FIG. 9 in the embodiments of this application. FIG. 9 is a schematic block diagram of the communication apparatus 900 according to an embodiment of this application. The communication apparatus may include at least one processor 901 and a power supply circuit 905. When related program instructions are executed in the at least one processor 901, the communication apparatus 900 may implement a function of the terminal device or the network device in the communication methods and any design thereof provided in all of the foregoing embodiments. The power supply circuit 905 may be configured to supply power to the processor 901. Optionally, the power supply circuit 905 may be located in a same chip as the processor 901. or located in another chip other than the chip in which the processor 901 is located. Optionally, the communication apparatus 900 may further include at least one memory 902, and the memory 902 may be configured to store the related program instructions and/or data that are/is required. Optionally, the communication apparatus 900 may further include a transceiver apparatus 903. The transceiver apparatus 903 may be used by the communication apparatus 900 to communicate and interact, for example, to exchange control signaling and/or service data, with another communication device (for example, a radio access nets pork device or a terminal device, which is not limited herein). The transceiver apparatus 903 may be implemented by using a circuit having a communication transceiver function. Optionally, as shown in FIG. 9, the communication apparatus 900 may further include a bus 904, and parts of the communication apparatus 900 may be interconnected by using the bus 904.

Figure 10:
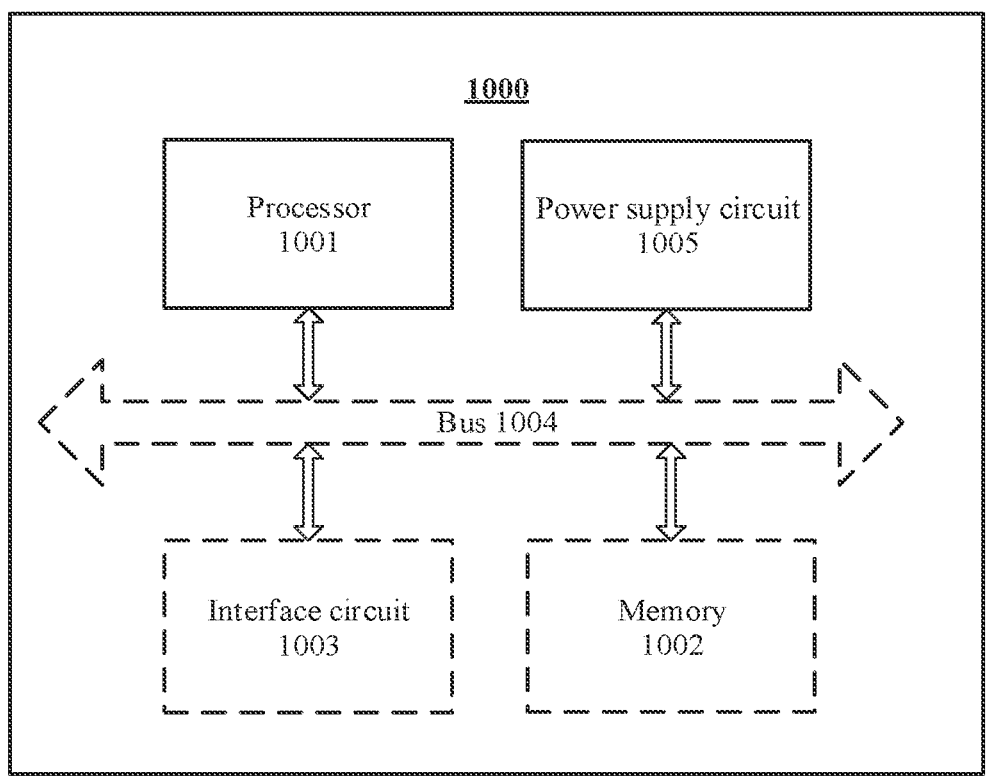
FIG. 10 is a schematic block diagram of a system chip according to an embodiment of this application.

An embodiment of this application provides a system chip 1000. The following specifically describes a structure and a function of the system chip 1000 with reference to FIG. 10 in the embodiments of this application. FIG. 10 is a schematic block diagram of the system chip 1000 according to an embodiment of this application. The system chip 1000 may be used in the terminal device or the network device described above. Processing by the system chip enables a terminal device or a network device to perform an operation performed by the terminal device or the network device in the communication methods and any possible design solution thereof provided in all of the embodiments of this application. As shown in FIG. 10, the system chip 1000 may include at least one processor 1001 and a power supply circuit 1005. When related program instructions are executed in the at least one processor 1001, an operation performed by the terminal device or the network device in the communication methods and any possible design solution thereof provided in all of the embodiments of this application is implemented. The power supply circuit 1005 may be configured to supply power to the processor 1001. Optionally, the power supply circuit 1005 may be located in a same chip as the processor 1001, or located in another chip other than the chip in which the processor 1001 is located. Optionally, the system chip 1000 may further include at least one memory 1002, and the memory 1002 stores the related program instructions, Optionally, the system chip 1000 may further include an interface circuit 1003 and a bus 1004. The at least one processor 1001, the at least one memory 1002, and the interface circuit 1003 are coupled through the bus 1004. The system chip 1000 interacts with a terminal device, a network device, or another device in a network through the interface circuit 1003. Optionally, the processor 1001 and the memory 1002 may be combined into one processing apparatus. For example, during specific implementation, the memory 1002 may be integrated into the processor 1001, or may be independent of the processor 1001.

It should be understood that, the processor in the embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It may be further understood that the memory in the embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, The volatile memory may be a random access memory (RAM), used as an external cache. By way of example but not limitative description, many forms of random access memories (RAM) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct ramous dynamic random access memory (DR RAM).

The power supply circuit in the embodiments of this application includes but is not limited to at least one of the following: a power supply subsystem, an electrical tube management chip, a power consumption management processor, or a power consumption management control circuit.

The transceiver apparatus, the interface circuit, or the transceiver in the embodiments of this application may include a separate transmitter and/or a separate receiver, or the transmitter and the receiver may be integrated. The transceiver apparatus, the interface circuit, or the transceiver may work under an indication of a corresponding processor.

Optionally, the transmitter may be corresponding to a transmitter in a physical device, and the receiver may be corresponding to a receiver in a physical device.

A person skilled in the art may clearly understand that, for the purpose of convenient and brief description, division of the foregoing function modules is merely used as an example for description. In an actual application, the foregoing functions may be allocated to different function modules for implementation based on a requirement. That is, an inner structure of an apparatus is divided into different function modules to implement all or some of the functions described above. For a detailed working process of the foregoing system, apparatus, and unit, refer to a corresponding process in the foregoing method embodiments. Details are not described herein again.

In the embodiments in this application, it should be understood that the disclosed system, apparatus, and method may be implemented in other manners. For example, the described apparatus embodiment is merely an example. For example, the module or unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In the embodiments of this application, the units described as separate components may or may not be physically separate, and components displayed as units may or may not be physical units, may be located in one position, or may be distributed on a plurality of network units. Some or all of the units may be selected according to actual requirements to achieve the objectives of the solutions of the embodiments in this application.

In addition, function units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the current technology, or all or some of the technical solutions may be implemented in a form of a software product. The computer software product is stored in a storage medium and includes several instructions for instructing a computer device (which may be a personal computer, a server, a radio access network device, or the like) or a processor to perform all or some of the operations of the methods in the embodiments of this application. The foregoing storage medium may include any medium or computer storage medium that can store program code, such as a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application.

What is claimed is:

1. A communication apparatus, which is a first network device or an apparatus included in the first network device, comprising:
   at least one processor, and
   one or more memories coupled to the at least one processor and storing programming instructions for execution by the at least one processor to perform operations comprising:
   sending request information to a second network device, wherein the request information comprises an identifier of a network slice, configuration information of a data radio bearer corresponding to the identifier of the network slice, and first general packet radio service tunneling protocol-user plane (GTP-U) tunnel address information corresponding to the identifier of the network slice; and
   receiving feedback information from the second network device, wherein the feedback information comprises second GTP-U tunnel address information corresponding to the identifier of the network slice, wherein:
   the first GTP-U tunnel address information and the second GTP-U tunnel address information identify a user plane tunnel that corresponds to the identifier of the network slice and that is between the first network device and the second network device,
   the request information further comprises indication information used to indicate whether the user plane tunnel is a unicast user plane tunnel or a multicast user plane tunnel, and
   the first network device has a radio link control layer function, a media access control layer function, and a physical layer function, and the second network device has a packet data convergence protocol layer function and a radio resource control layer function.

2. The communication apparatus according to claim 1, wherein the configuration information of the data radio bearer comprises at least one of a logical channel identifier or an identifier of the data radio bearer.

3. The communication apparatus according to claim 1, wherein the first GTP-U tunnel address information or the second GTP-U tunnel address information comprises at least one of an Internet Protocol (IP) address or a tunnel endpoint identifier (TEID).

4. A communication apparatus, which is a second network device or an apparatus included in the second network device, comprising:
   at least one processor, and
   one or more memories coupled to the at least one processor and storing programming instructions for execution by the at least one processor to perform operations comprising:
   receiving request information from a first network device, wherein the request information comprises an identifier of a network slice, configuration information of a data radio bearer corresponding to the identifier of the network slice, and first general packet radio service tunneling protocol-user plane (GTP-U) tunnel address information corresponding to the identifier of the network slice; and sending feedback information to the first network device, wherein the feedback information comprises second GTP-U tunnel address information corresponding to the identifier of the network slice, wherein:

the first GTP-U tunnel address information and the second GTP-U tunnel address information identify a user plane tunnel that corresponds to the identifier of the network slice and that is between the first network device and the second network device, the request information further comprises indication information used to indicate whether the user plane tunnel is a unicast user plane tunnel or a multicast user plane tunnel, and the first network device has a radio link control layer function, a media access control layer function, and a physical layer function, and the second network device has a packet data convergence protocol layer function and a radio resource control layer function.

5. The communication apparatus according to claim 4, wherein the configuration information of the data radio bearer comprises at least one of a logical channel identifier or an identifier of the data radio bearer.

6. The communication apparatus according to claim 4, wherein the first GTP-U tunnel address information or the second GTP-U tunnel address information comprises at least one of an Internet Protocol (IP) address or a tunnel endpoint identifier (TEID).

7. A communication apparatus, comprising:
at least one processor, and
one or more memories coupled to the at least one processor and storing programming instructions for execution by the at least one processor to perform operations comprising:

receiving a request message from a radio access network device, wherein the request message comprises an identifier of a network slice and first general packet radio service tunneling protocol-user plane (GTP-U) tunnel address information corresponding to the identifier of the network slice; and sending second GTP-U tunnel address information corresponding to the identifier of the network slice to the radio access network device, wherein:

the first GTP-U tunnel address information and the second GTP-U tunnel address information identify a user plane tunnel that corresponds to the identifier of the network slice and that is between the radio access network device and a core network user-plane network element, and the request message further comprises indication information used to indicate whether the user plane tunnel is a unicast user plane tunnel or a multicast user plane tunnel.

8. The communication apparatus according to claim 7, wherein the first GTP-U tunnel address information or the second GTP-U tunnel address information comprises at least one of an Internet Protocol (IP) address or a tunnel endpoint identifier (TEID).

* * * * *